US012573392B1

(12) United States Patent
Wang et al.

(10) Patent No.: US 12,573,392 B1
(45) Date of Patent: Mar. 10, 2026

(54) IDENTIFY RECEIPT OF USER DATA IN INTERACTIONS

(71) Applicant: Amazon Technologies, Inc., Seattle, WA (US)

(72) Inventors: Yibo Wang, Bellevue, WA (US); Tianyu Xu, Woodinville, WA (US); Daniel Lior Bankirer, New York, NY (US); Varun Juneja, Bellevue, WA (US); Felicia A McClary, Oak Harbor, WA (US); Dilip Sridhar, Sammamish, WA (US); Kiran Kumar Grandhi, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 356 days.

(21) Appl. No.: 18/188,785

(22) Filed: Mar. 23, 2023

(51) Int. Cl.
*G10L 15/22* (2006.01)
*G10L 15/18* (2013.01)
*G10L 15/30* (2013.01)

(52) U.S. Cl.
CPC .......... *G10L 15/22* (2013.01); *G10L 15/1815* (2013.01); *G10L 2015/223* (2013.01); *G10L 2015/227* (2013.01); *G10L 15/30* (2013.01)

(58) Field of Classification Search
CPC ..... G10L 15/22; G10L 15/1815; G10L 15/30; G10L 2015/223; G10L 2015/227
See application file for complete search history.

(56) References Cited

U.S. PATENT DOCUMENTS 11,227,591 B1 *   1/2022   Ockene ................... G06F 21/32

* cited by examiner

*Primary Examiner* — Daniel C Washburn
*Assistant Examiner* — Penny L Caudle
(74) *Attorney, Agent, or Firm* — Pierce Atwood LLP

(57) ABSTRACT

Techniques for determining one or more expected categories of data for receipt by a skill or application and comparing the expected categories of data to user disclosed data, such as from a spoken natural language user input. The techniques include determining the spoken natural language user input is directed at an interaction with a particular skill and identifying a set of data categories registered for receipt by the skill. The techniques may further include determining if the skill solicited the disclosed data of the user input or if the user mistakenly provided the disclosed data. In some embodiments, the interaction with the skill may end if the skill is not authorized to receive the disclosed data. In some embodiments, the unsolicited disclosed data may be used to identify misunderstood or confusing requests for user input.

20 Claims, 15 Drawing Sheets

Skill Profile

Skill Name
[pizza restaurant]

Version
2.1

Skill Category
Food_Delivery

Developer
Apps for Apps
Software

Rating
4/5

Locale
US-English

Developer Reported Data Types Collected

User Info
Full Name
Email Address
Phone Number

Location
Approximate Location

Financial Info
Last 4 Digits of CC
Purchase History

Skill Activity
Usage History

FIG. 8

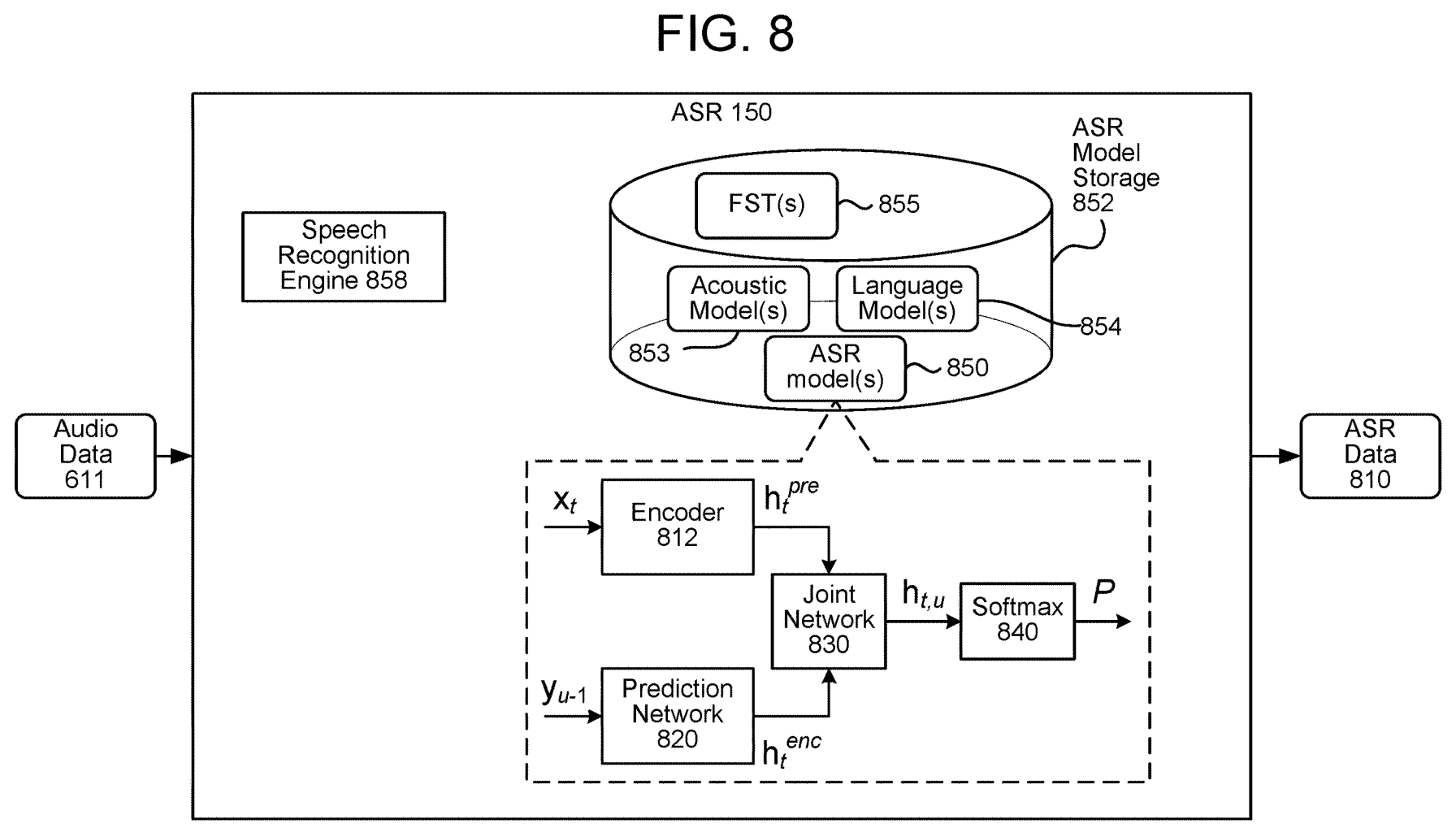

ASR Data 810

Speech Recognition Engine 858

ASR 150

ASR Model Storage 852

854

FST(s) 855

Language Model(s)

Acoustic Model(s)

ASR model(s) 850

853

Encoder 812

$x_t$ $h_t^{pre}$

Prediction Network 820

$y_{u-1}$ $h_t^{enc}$

Joint Network 830

$h_{t,u}$

Softmax 840

$P$

Audio Data 611

Figure 11:
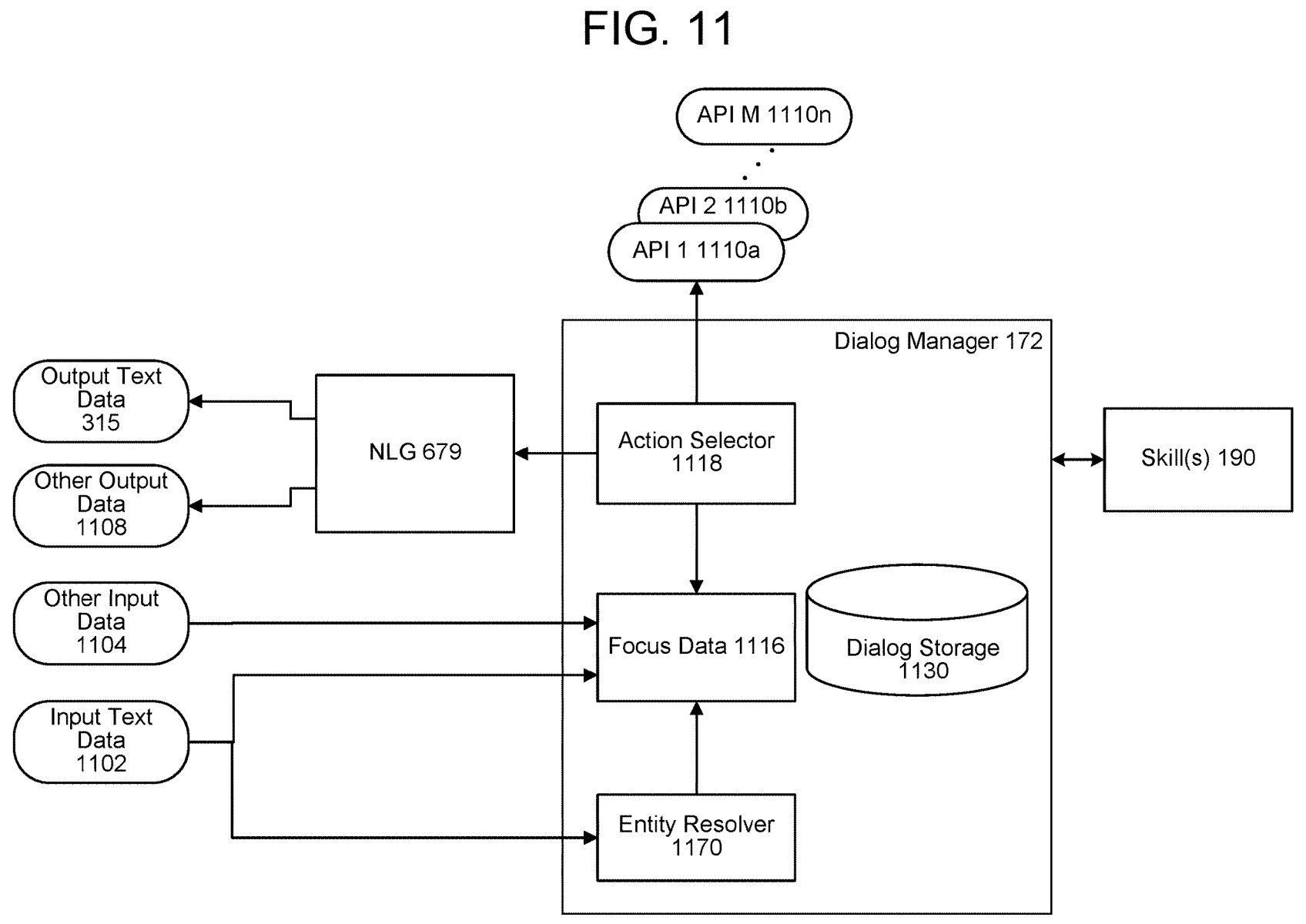

Skill(s) 190

Dialog Manager 172

Dialog Storage 1130

API M 1110n

API 2 1110b

API 1 1110a

Action Selector 1118

Focus Data 1116

Entity Resolver 1170

NLG 679

Output Text Data 315

Other Output Data 1108

Other Input Data 1104

Input Text Data 1102

FIG. 13

System(s) 120/125

Bus 1324

Network(s) 199

I/O Device Interfaces 1302

Controller(s) / Processor(s) 1304

Memory 1306

Storage 1308

FIG. 14

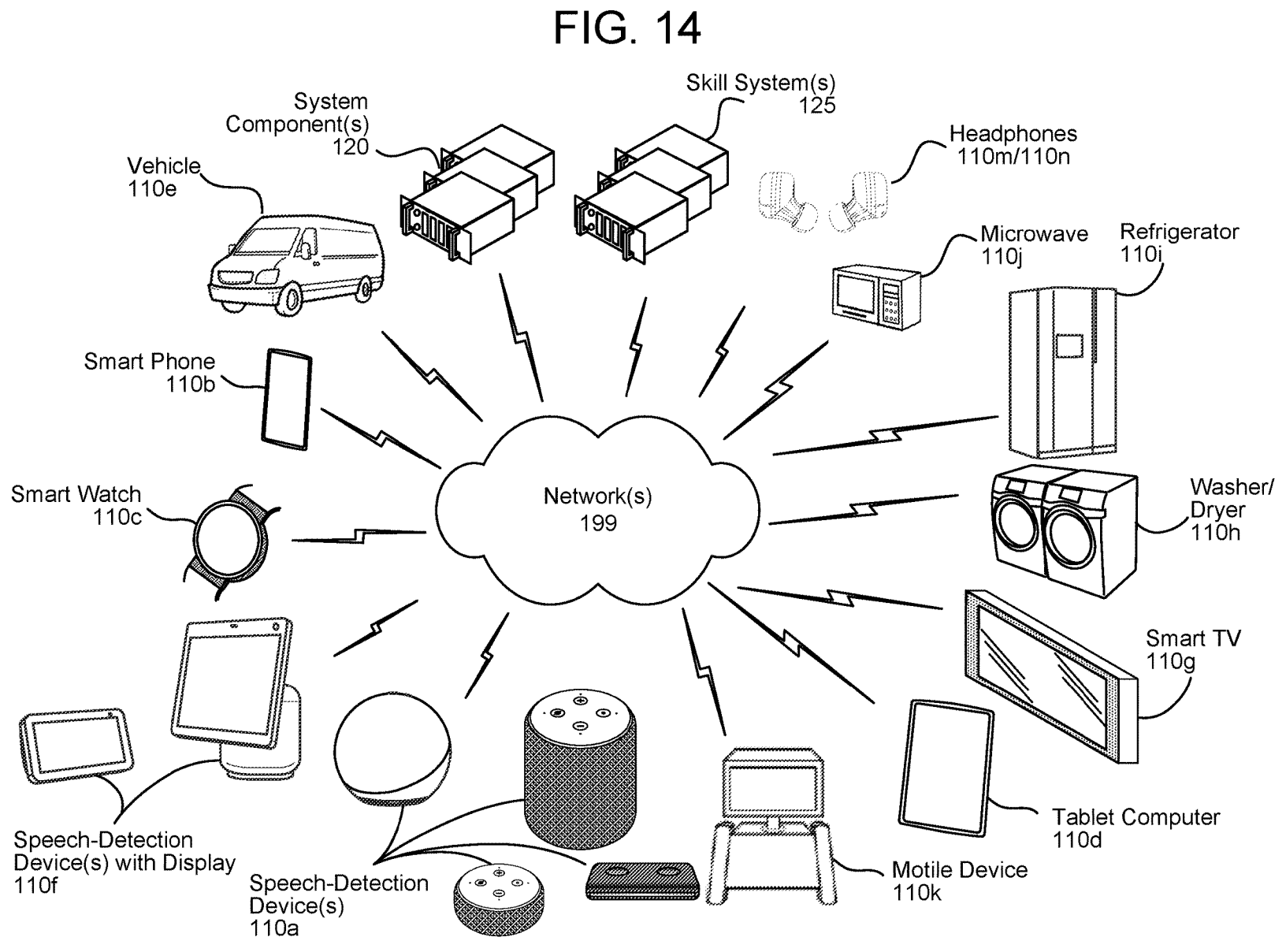

Headphones
110m/110n

Microwave
110j

Refrigerator
110i

Washer/
Dryer
110h

Smart TV
110g

Tablet Computer
110d

Motile Device
110k

Skill System(s)
125

System
Component(s)
120

Network(s)
199

Speech-Detection
Device(s)
110a

Vehicle
110e

Smart Phone
110b

Smart Watch
110c

Speech-Detection
Device(s) with Display
110f

IDENTIFY RECEIPT OF USER DATA IN INTERACTIONS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 8 is a conceptual diagram of an ASR component, according to embodiments of the present disclosure.

FIG. 9 is a conceptual diagram of how natural language processing is performed, according to embodiments of the present disclosure.

FIG. 11 is a conceptual diagram of components of a dialog manager component, according to embodiments of the present disclosure.

FIG. 13 is a block diagram conceptually illustrating example components of a system, according to embodiments of the present disclosure.

FIG. 14 illustrates an example of a computer network for use with the overall system, according to embodiments of the present disclosure.

DETAILED DESCRIPTION

Figure 1:
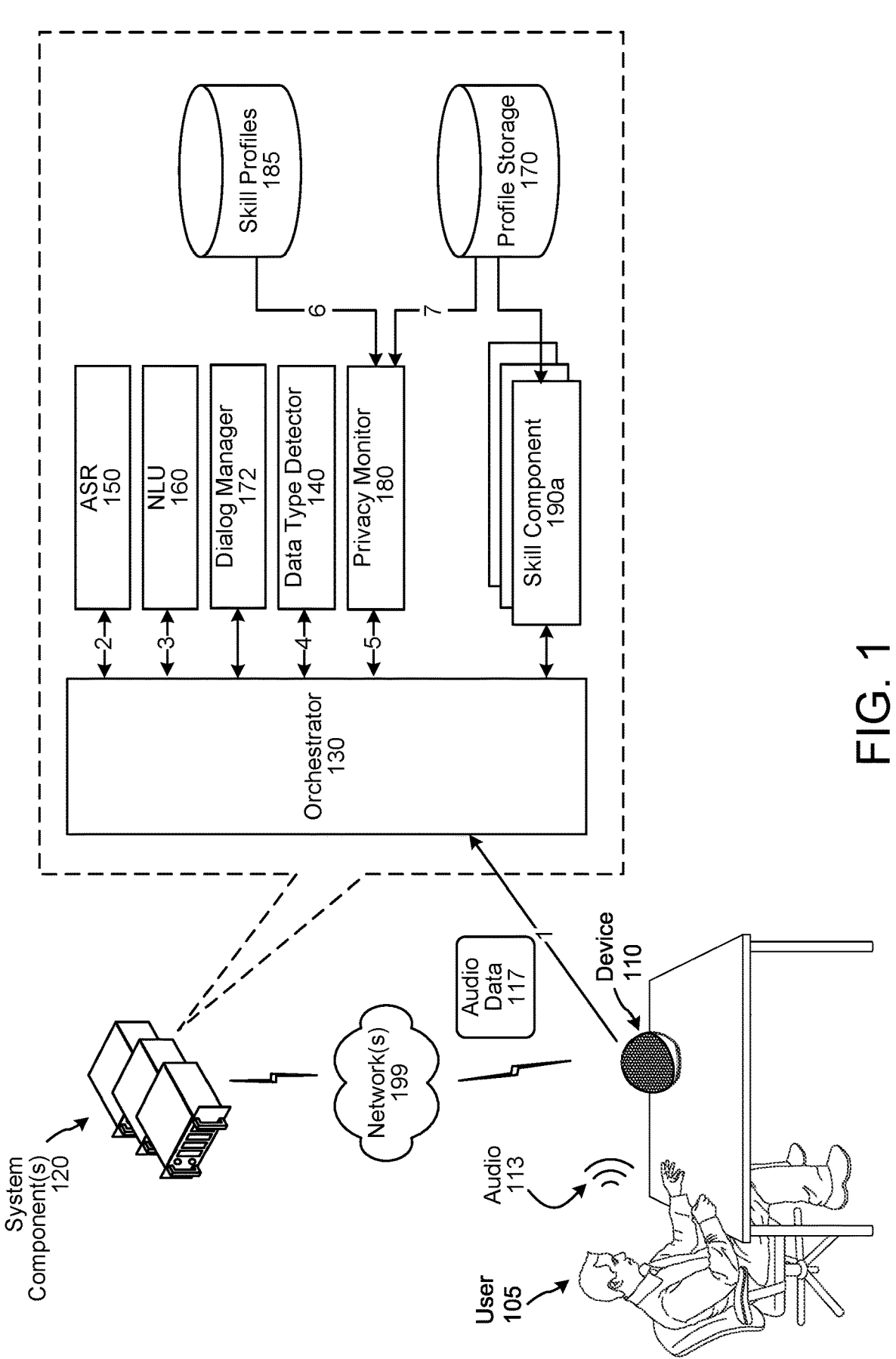
FIG. 1 is a conceptual diagram illustrating identifying receipt of user data for interactions with a virtual assistant system, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system.

A virtual assistant system may execute one or more skills. As used herein, a "skill" may refer to software, that may be placed on a machine or a virtual machine (e.g., software that may be launched in a virtual instance when called), configured to perform one or more actions in response to user inputs (such as spoken or other natural language inputs). For example, for the spoken natural language input "play music by <artist>," a skill may output music sung by the indicated artist. For further example, for the spoken natural language input "turn on the lights," a skill may cause one or more "smart" lights to operate in an "on" state. In another example, for the spoken natural language input "what is the weather," a skill may output weather information for a geographic location corresponding to the device that captured the spoken natural language input. What is described herein as a skill may be referred to using different terms, such as an action, bot, application, processing component, or the like.

In some instances, a skill may request personally identifiable information (PII) and/or other personal information (referred to herein as "sensitive data") from a user. This may include demographic information, bank account information, credit card numbers, home address, etc. Such information may be necessary for the skill to perform the action desired by a user. For example, a user may provide the spoken natural language user input of "Order a pizza from the [pizza restaurant]" to order a pizza via a skill for pizza delivery (e.g., a "[pizza restaurant]" skill). To facilitate such a transaction, the skill may request sensitive information from the user, such as a credit card number to pay for the pizza and the user's home address for the location to deliver the pizza. For privacy protection, system management, and other reasons, the developer or owners of a skill (referred to herein as skill developers) that receives data types corresponding to sensitive data may be required to report the data types received. Such reporting may be used to manage what skills are accessing what types of user information and to otherwise manage and protect access to PII.

Skill developers may develop and publish skills for users/customers to use with a virtual assistant system (e.g., Alexa by Amazon). The skill developers may publish the data types received, such as part of a privacy policy published on a website, as well as report the data types received to the virtual assistant system. Such a privacy policy may describe how the skill developers are using the PII collected. However, sometimes skill developers may unintentionally not accurately disclose all of the data types collected. In some instances, the privacy policy may unintentionally include inaccurate information (such as not indicating that a user's phone numbers are collected). Additionally, the privacy policy may become stale, such as if a new version of the skill is released that collects additional data types, but the privacy policy is not updated accordingly.

Additionally, in some instances a user may provide sensitive data during a skill interaction but the skill may not have requested or solicited such information. In some instances, this may be accidental and a mistake of the user. However, multiple occurrences of users providing the same type of unsolicited sensitive information may indicate that the skill is generating output which is being interpreted by users as a request for the particular unsolicited sensitive information. It may thus be desirable to take certain actions to cause the skill to adjust its operations that are leading to the exchange of unsolicited, and unnecessarily disclosed, sensitive information.

FIG. 1 is a conceptual diagram illustrating a virtual assistant system 100 for natural language processing, according to embodiments of the present disclosure. The present disclosure describes techniques that enable the system 100 to detect user data collection by a skill component 190a through communications with a user 105. Data type detection or other techniques may be used to detect if user data of a certain type (e.g., PII, sensitive data, etc.) is provided in a voice dialog session with the system 100 corresponding to a skill component 190a. Additionally, the present disclosure describes techniques to determine whether the detected sensitive data was solicited or unsolicited by the skill component 190a. The system 100 may receive metadata for the skill component 190a that identifies data types (e.g., home address, credit card number, etc.) corresponding to the sensitive data used by the skill component 190a. The data types detected during the data type detection may be compared with data types identified in the skill metadata to determine whether the skill component 190a is collecting sensitive data whose collection was not disclosed by the skill developers. Identifying data types collected which have not been disclosed by the skill developers may be used, for example, to prevent skills or interactions that collect sensitive information that the user has not given permission to collect and for which the skill was unregistered, or not approved, to collect.

Additionally, the present disclosure describes techniques to determine whether the detected sensitive data was solicited or unsolicited by the skill component 190a. The methods and techniques described herein may identify instances or skill interactions where a user may volunteer sensitive data, when such data is unsolicited by the virtual assistant system or a particular skill. An alert may be provided to the user when it is determined the user provides unsolicited sensitive information.

Additionally, dialog session data may be provided to the skill developers to determine whether the output and/or responses generated by the skill are confusing or misworded in such a way that is causing users to volunteer sensitive data. The dialog session data may be used to identify the one or more system outputs, or skill responses, that preceded a user input that included sensitive data. The dialog session data may be identified by a dialog session identification that corresponds to a dialog session stored in the dialog storage 1130. In addition to data corresponding to the turns of the dialog (e.g., user input, system output, etc.), the dialog session data may indicate one or more user profiles corresponding to the speaker(s) of the dialog session. The dialog session data may include a skill identifier corresponding to the one or more skills that were invoked during the dialog session and that may or may not have provided output data.

Detecting instances where a user provided a spoken natural language user input that includes unsolicited sensitive information may assist people that are less familiar with technology, such as senior citizens. Such users may get different user IDs and account numbers confused and provide data like a checking account number when it is not requested. For example, the skill may generate an output of "Please provide user ID," but the user instead states their Social Security number. Further, some users may not understand what information is safe to share and what information should be kept private.

The system 100 may determine a set of data types corresponding to the sensitive data collected by a particular skill. The data types, such as home address or credit card number, may be determined based on the data types disclosed by the skill developers as well as the detected data types from the sensitive data provided during interactions with the skill component 190a. The set of data types corresponding to a skill component 190a may be included in the metadata provided to the privacy monitor 180. Additionally, a user 105 may request the set of data types corresponding with a particular skill (e.g., "What user information does the [pizza restaurant] skill request?"). A virtual assistant system 100 that supports voice dialogs and interactions may receive information spoken by a user as part of a dialog. As the information received is from a spoken language input, there are no constraints or restrictions on the type of information that may be provided, whether intentional or not. This differs from other types of computer system interactions, such as web pages on the Internet. For example, a web page may have a preconfigured form such that separate form fields are provided for different types of data (e.g., name, address, credit card number, etc.) such that a user may be restricted in the type of information that may be provided for a defined form field.

As shown in FIG. 1, the virtual assistant system 100 may include a voice-enabled device 110 local to a user 105, a natural language command processing system 120 (abbreviated "system component(s) 120"), and one or more skill support systems 125 (shown in FIG. 6) connected across one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The device 110 may receive audio 113 corresponding to a spoken natural language input originating from the user 105. The device 110 may process audio 113 following detection of a wakeword. The device 110 may generate audio data 117 corresponding to the audio 113, and may send the audio data 117 to the system component(s) 120. The device 110 may send the audio data 117 to the system component(s) 120 via an application that is installed on the device 110 and associated with the system component(s) 120. An example of such an application is the Amazon Alexa application that may be installed on a smart phone, tablet, or the like. In some implementations, the device 110 may receive text data 613 corresponding to a natural language input originating from the user 105, and send the text data to the system component(s) 120. The device 110 may also receive output data from the system component(s) 120, and generate a synthesized speech output. The device 110 may include a camera for capturing image and/or video data for processing by the system component(s) 120. Examples of various devices 110 are further illustrated in FIG. 14. The system component(s) 120 may be remote system(s) such as a group of computing components located geographically remote from device 110 but accessible via network 199 (for example, servers accessible via the internet). The system component(s) 120 may also include a remote system that is physically separate from device 110 but located geographically close to device 110 and accessible via network 199 (for example a home server located in a same residence as device 110). System component(s) 120 may also include some combination thereof, for example where certain components/operations are performed via a home server(s) and others are performed via a geographically remote server(s).

The system 100 may be configured to detect user provided information corresponding to data types of sensitive data. As illustrated in FIG. 1, the system component(s) 120 may include an orchestrator component 130, an ASR component 150, an NLU component 160, a data type detector component 140, and a privacy monitor component 180. These components, and others, are discussed below in reference to FIGS. 6 and 7. Additionally, the system component(s) 120 may include skill component(s) 190 corresponding to one or more skill applications and profile storage 170 for storing user profile data. Although the figures illustrate the components in a particular arrangement, one skilled in the art will appreciate that different combinations and/or arrangements of the components are possible depending on the system's configuration without departing from the present disclosure. Moreover, it is noted that one or more of the components of the system component(s) 120 noted above may be implemented by the user device 110.

Referring to FIG. 1, a user 105 may provide a user input to the user device 110. The user device 110 may generate and send, to the system component(s) 120, input data corresponding to the user input. For example, the user 105 may speak an utterance (e.g., a spoken natural language user input) and the user device 110 may receive the utterance as input (analog) audio 113 and generate (digitized) input audio data 117 corresponding to the audio 113, where the input audio data 117 forms at least a portion of the input data. For further example, the user 105 may provide a typed natural language user input as input text, and the user device 110 may generate input text data corresponding to the input text, wherein the input text data forms at least a portion of the input data. Other types of user inputs may also be processed using the techniques described herein. Some user inputs may be converted to a different form for further processing. For example, the input data may include image data representing a gesture (e.g., pointing to an object, showing a number, etc.) performed by the user 105 and the system component(s) 120 may process the image data to determine data (e.g., text data, intent data, entity data, etc.) representing a meaning of the gesture input.

The user device 110 may send the input data to the system component(s) 120 via an application that is installed on the user device 110 and associated with the system component(s) 120. An example of such an application is the Amazon Alexa application that may be installed on a smart phone, tablet, or the like.

The user device 110 may generate input audio data 117 corresponding to the audio 113 of the spoken responsive natural language user input, and send (step 1) the input audio data 117 to the orchestrator component 130. For further example, the user device 110 may receive typed text of a responsive natural language user input, where this responsive natural language user input may include one or more sentences. In this example, the user device 110 may generate input text data corresponding to the typed text, and send the input text data to the orchestrator component 130 as or as part of the input data. In addition, the orchestrator component 130 may send the input audio data 117 to the data type detector component 140 and the privacy monitor component 180.

The system component(s) 120 may receive, at the orchestrator component 130, the input data representing the user input. In situations where the input data is or includes input audio data 117 of a spoken natural language user input, the orchestrator component 130 may send (step 2) the input audio data 117 to the ASR component 150. The ASR component 150 may process the input audio data 117 to generate ASR results data corresponding to the spoken natural language user input, which the ASR component 150 may send to the orchestrator component 130. The ASR results data may include one or more ASR hypotheses, where an ASR hypothesis is a digital natural language representation (e.g., text or tokenized representation) of the spoken natural language input. Example processing of the ASR component 150 is described in detail herein below with respect to FIG. 8.

The orchestrator component 130 may send (step 3) the ASR results data to the NLU component 160. Alternatively, in situations where the input data is or includes input text data of a typed natural language user input, the orchestrator component 130 may send the input text data to the NLU component 160, without sending and receiving data to and from the ASR component 150. The NLU component 160 may be configured to process the ASR results data (or input text data) to generate NLU results data. The NLU results data may include one or more NLU hypotheses, each representing a respective semantic interpretation of the natural language user input as represented in the ASR results data (or input text data). For example, a NLU hypothesis may include an intent determined by the NLU component 160 to represent the natural language user input. A NLU hypothesis may optionally also include one or more entity types and corresponding entity values corresponding to entities determined by the NLU component 160 as being referred to in the natural language user input. Example processing of the NLU component 160 is described herein below with respect to FIGS. 9 and 10. The NLU component 160 may send the NLU results data to the orchestrator component 130.

Upon receiving the NLU results data the skill component 190a, may generate an output corresponding to the input. Such an output may include a natural language output responsive to the input and/or a command to another device (e.g., a lightbulb, etc.) to execute an action requested by the input. In some embodiments, upon the skill component 190a receiving NLU results data, the skill component 190a may send the text or token data to a TTS component 680 of the system component(s) 120, and the TTS component 680 may process the text or token data to generate output audio data. The output audio data may then be output to the user 105 via the user device 110.

As described herein below with respect to FIG. 11, the dialog manager 172 may manage and/or track a dialog between a user 105 and a device 110. The dialog manager 172 may determine the appropriate system generated response to give to a particular utterance or user input of a turn. Or creation of the system generated response may be managed by another component of the system (e.g., NLG 679, orchestrator 130, etc.) while the dialog manager 172 selects the appropriate responses. Based on the input data and the determined skill component 190a, the system may generate a response to the user input. The action selector 1118 of the dialog manager 172 may select the skill component 190a based on the dialog between the user 105 and the device 110. Instead of the dialog manager 172 selecting a response, the action selector 1118 may select a skill component 190a based on the dialog, as described further below with respect to FIG. 11. Additionally, the NLG 679 may generate output text data 315 based on input received from the dialog manager 172 and described in detail below in reference to FIG. 11. In some embodiments, the data type detector 140 and/or the privacy monitor 180 may be incorporated into the dialog manager 172.

The orchestrator 130 may send (step 4) the ASR results and/or NLU results to the data type detector 140. The data type detector 140 may be configured to identify, or detect, different types of user data, such as PII or sensitive data, in spoken natural language user input (e.g., audio data 117) received by the device 110 from the user 105. For example, the audio 113 received by the device 110 may be a natural language input identifying the user's home address (e.g., "My home address is [street address].") The data type detector component 140 may use pattern matching (such as defined regular expression patterns) to identify data types in the textual representation of the user input (e.g., ASR results data). For example, a sequence of sixteen numbers may correspond to a pattern for a credit card number. The data type detector component 140 may also use information about an audio input to potentially identify different types of sensitive data. For example, determining that a sequence of sixteen numbers spoken in groups of four with pauses in between may be more likely to correspond to a credit card number or a sequence of nine numbers spoken in a group of three, followed by a group of two, followed by a group of four may be more likely to correspond to a social security number.

Data type detection may include identifying keywords within the spoken natural language user input (e.g., ASR data 810). For example, the keyword "neighborhood" may be used in identifying a general locale that the user 105 is located (e.g., "We are in the Fernhill Neighborhood"). Keywords may also be used to determine a portion of sensitive data from the spoken natural language user input and then the data type detector component 140 may determine additional words or phrases relative to the keyword to identify the sensitive data. For example, the keywords "street" or "avenue" may be used to determine that an address is provided in the spoken natural language user input (e.g., "123 Main Street"). Additionally, some keywords may expose private characteristics of the user 105, such as keywords corresponding to religion or the keywords "husband" or "wife" that may be indicative of the user's sexual orientation. The data type detector component 140 may be configured to identify sensitive data or requests for sensitive data in input or outputs that include homophones or misspellings (e.g., "credit card").

The data type detector component 140 may be configured to identify phrases, or data types, corresponding to, but not limited to, demographic information (e.g., age, gender, race), phone number, date of birth, email address, user names or identifiers, political or religious beliefs or affiliation, race or ethnicity, sexual orientation, home address, approximate location (e.g., neighborhood or landmarks), precise location (e.g., global positioning system coordinates), device identifiers, bank account number, credit card numbers, the last four digits of an account number, purchase history, personal reminders, health information, fitness information, usage history (e.g., usage of a skill, application, etc.), calendar events, or other data.

The data type detector component 140 may determine detected data that identifies the data types identified in the user input. The detected data may correspond to individual user input instances or a dialog session including one or more spoken natural language user inputs.

The orchestrator 130 may receive the detected data from the data type detector 140. The orchestrator may then send (step 5) the detected data to the privacy monitor 180. The privacy monitor 180 may be configured to determine if the data types identified by the data type detector component 140 are indicated as a disclosed data type received by a particular skill component 190a as part of interactions with that particular skill component 190a. For example, the detected data may identify the user input (e.g., audio data 117) included a street address, such as an address corresponding to a home address.

In some embodiments, the disclosed data types may be self-identified, such as by the skill developers. In some embodiments, the disclosed data types may be determined from a registration and/or approval process, such as when the skill is incorporated in the system 100. The disclosed data types may be considered to be registered, approved, or authorized for the skill to receive and use. The privacy monitor 180 may receive (step 6) metadata from skill profile database 185 for the skill component(s) 190 that corresponds with the dialog session of the detected data. The skill profile database 185 may store profile information corresponding to the one or more skills of the system 100. The skill profile may include information such as a skill name and a skill category, as described in detail below in reference to and illustrated by FIG. 4. The metadata may identify the set of disclosed data types the particular skill component 190a may request and/or receive. For example, a pizza delivery skill may identify disclosed data types of a home address and credit card number. In another example, a weather skill may identify a disclosed data type of a city.

The privacy monitor 180 compares the detected data and the set of disclosed data types to determine whether the detected data includes one or more data types that are unregistered or not part of the set of disclosed data types. If the privacy monitor 180 identifies the detected data includes a data type that is unregistered for the skill (e.g., not part of the set of disclosed data types), mismatch data may be generated. For example, the privacy monitor 180 may determine a mismatch if the user 105 provides their complete home address (e.g., "My home address is [street address].") to the weather skill. In some instances, the mismatch data may be aggregated and when the number of aggregated mismatches exceeds a threshold value, a mismatch report may be generated and sent to the skill developers. Sensitive data may be inadvertently disclosed by users, such as a first person providing sensitive information in a phone call while a second person orders a pizza via the [pizza restaurant] skill. When mismatch data is determined, notifications and/ or warnings may be provided to the user 105 to alert them to potential disclosure of sensitive data (e.g., "Are you sure you meant to provide your Social Security number?").

The profile storage 170 may store user profile data, such as user information and preferences. The skill component(s) 190 may access the profile storage 170 for user profile data to customize responses and user interaction. The user 105 may be determined using user recognition, such as using voice or facial recognition. Additionally, the profile storage 170 may store, corresponding to a user profile, user preferences for sensitive data that may be shared with skills. The information sharing preferences may be customized per skill or applied to any skill. In some embodiments, the privacy monitor 180 may access (step 7) the information sharing preferences corresponding to the user 105 that are stored in the profile storage 170. The privacy monitor 180 may then compare data types identified in the information sharing preferences to the detected data corresponding to a spoken natural language user input. If the privacy monitor 180 determines the detected data includes a data type that the user 105 has indicated should not be shared, the privacy monitor 180 may intercept the user input (e.g., ASR data 810 and NLU results data 1085) and prevent the user input from being sent to the skill component 190*a*.

The system 100 may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 2:
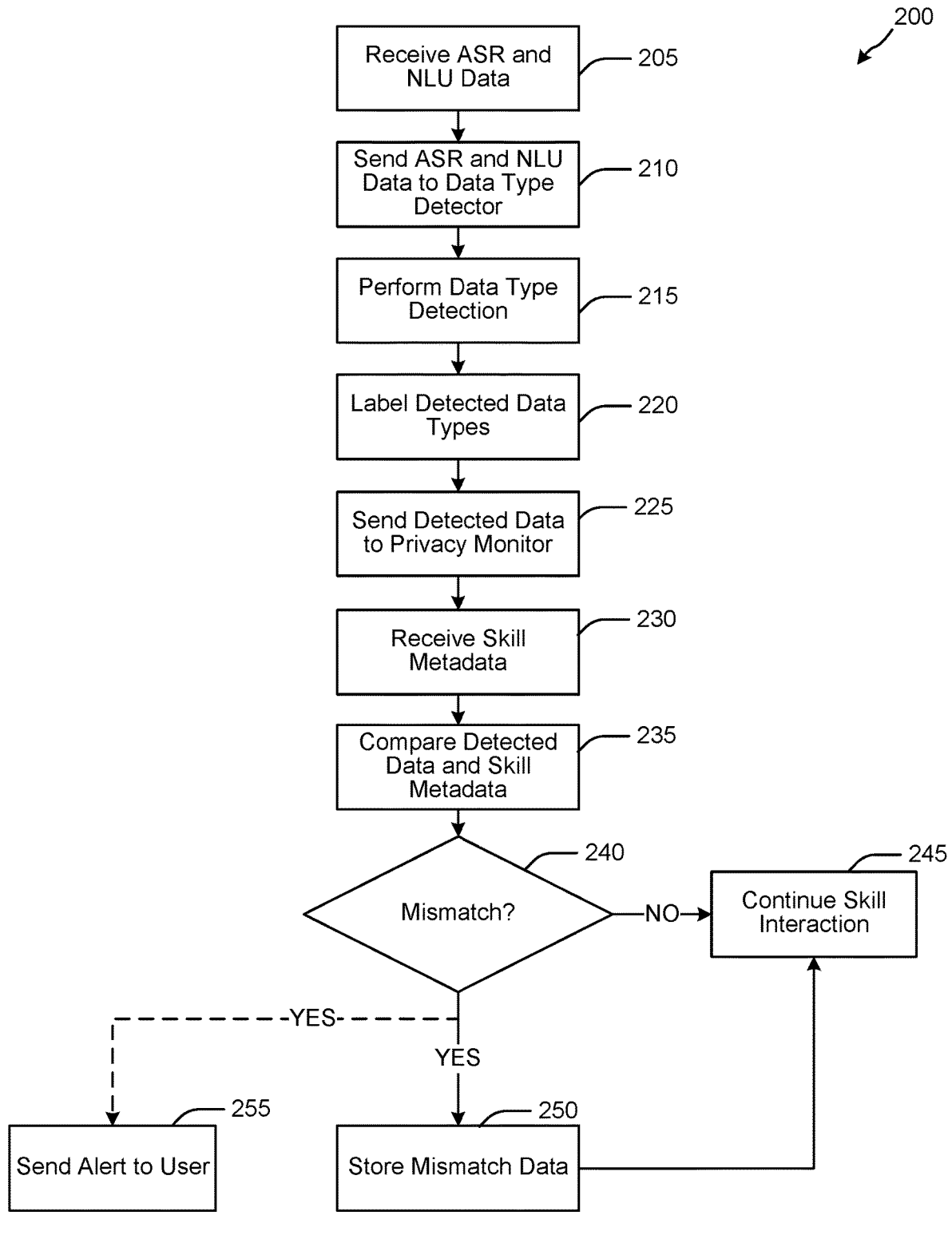
FIG. 2 is a flowchart illustrating operations of an example method of identifying user data received during an interaction with a virtual assistant system, according to embodiments of the present disclosure.

FIG. 2 illustrates a flowchart of operations of an example method of identifying sensitive data collected during an interaction with a virtual assistant system, according to embodiments of the present disclosure. The method 200 (illustrated in FIG. 2) may be performed by the system component(s) 120 of the virtual assistant system 100.

The method 200 may include receiving (205) the results of the ASR processing and/or NLU processing (e.g., ASR data 810 and NLU results data 1085), as described in greater detail below with regard to FIGS. 8-10. The orchestrator 130 may receive ASR data 810 from the ASR component 150 and/or NLU results data 1085 from the NLU component 160.

The method 200 may include sending (210) the ASR data 810 and/or NLU results data 1085 to the data type detector 140. The method 200 may also include sending audio data 117 to the data type detector 140. The method 200 may include performing (215) data type detection by the data type detector component 140. The data type detector component 140 may use a set of data types and their corresponding definitions (e.g., credit card number corresponds to sixteen digits, birthdate may correspond to either six or eight digits, etc.) to identify portions of the ASR data 810 and/or NLU results data 1085 that correspond with the set of data types, such as data types for PII or sensitive information. The set of data types may include phone number or address and is detailed above in relation to the data type detector component 140 of FIG. 1. The data type detector 140 may identify data types or phrases that are sensitive adjacent, such as the neighborhood the user 105 lives in or their zip code, which may not be exact PII (e.g., home address), but may be used to deduce PII of the user 105. The method 200 may include labeling (220) the detected data types to generate detected data. The detected data may represent the one or more data types found in a spoken natural language user input and as identified by the data type detector component 140.

Figure 4:
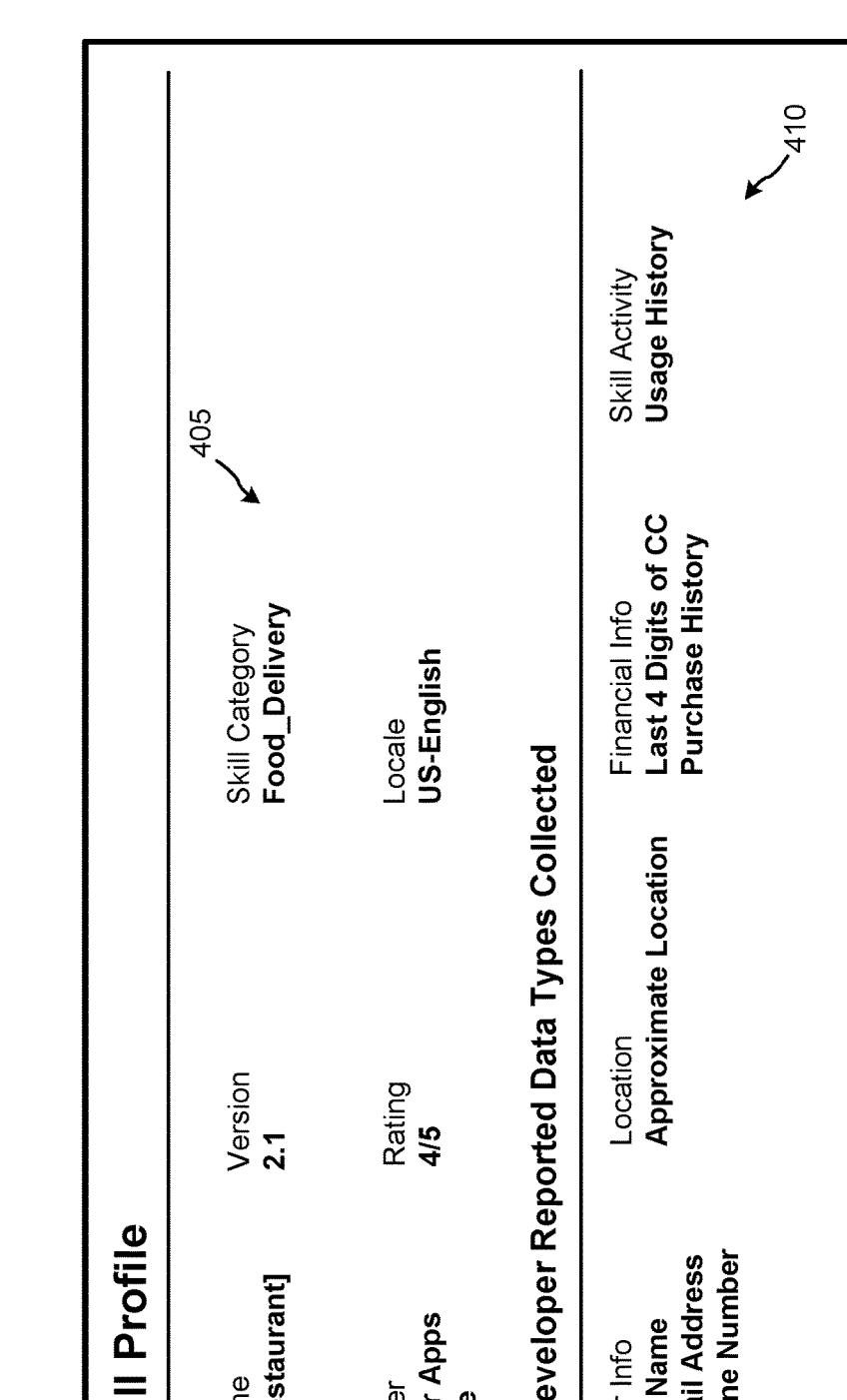
FIG. 4 illustrates an example of a skill profile, according to embodiments of the present disclosure.
Figure 5A:
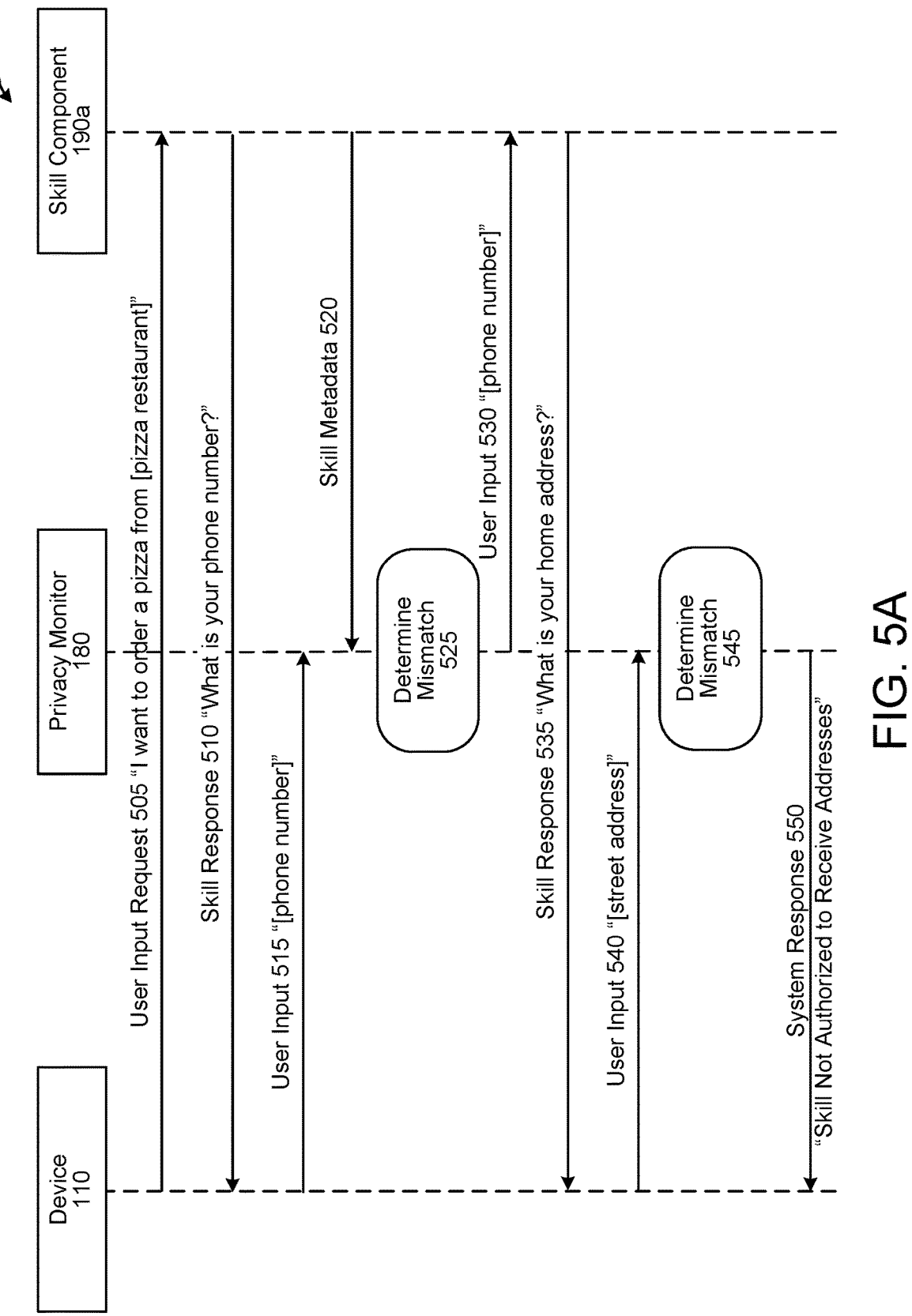
FIGS. 5A and 5B illustrate example exchanges of data during dialog sessions with the virtual assistant system, according to embodiments of the present disclosure.

The method 200 may include sending (225) the detected data to the privacy monitor 180. The method 200 may include the privacy monitor 180 receiving (230) the skill metadata, which includes the set of disclosed data types, from one or more skill component(s) 190. The skill metadata may include the set of disclosed data types that are requested and used by the particular skill component 190*a*, such as illustrated in FIG. 4. The privacy monitor 180 may receive the skill metadata at different points during the method 200. For example,) the results of the ASR processing and/or NLU processing (e.g., ASR data 810 and NLU results data 1085) may identify the skill and the privacy monitor 180 may request the skill metadata from the skill profile database 185. Additionally, during the course of an interaction/conversation (such as illustrated in FIG. 5A) the privacy monitor 180 may store the skill metadata between each user response.

The method 200 may include performing (235) a comparison of the detected data and the set of disclosed data types. The privacy monitor 180 may compare the one or more data types identified in the detected data to the set of disclosed data types identified in the skill metadata. The privacy monitor 180 determines, based on the comparison, if the one or more data types of the detected data is registered for the skill, or found in the set of disclosed data types. If the one or more data types of the detected data is unregistered for the skill, or not a member of the set of disclosed data types, then a mismatch may have occurred. For example, if the set of disclosed data types includes phone number and home address and the detected data identifies that the credit card number data type was provided in the user input, then the privacy monitor 180 determines a mismatch. Conversely, if the detected data identifies that the home address data type was provided in the user input, then the privacy monitor 180 does not determine a mismatch.

In some embodiments, if the privacy monitor 180 determines a mismatch, the privacy monitor 180 may determine a severity level for the mismatch. The degrees of severity levels (e.g., low or high, a percentage value, etc.) may be predetermined for the system 100. The severity level may be based on the data type and the amount of user data the data type relates to if exposed, such as the impact it may have for the user. For example, the neighborhood data type or religion data type may be low as type of user information is less significant and the amount of other user data that may be determined is low. The credit card number data type or home address data type may be high as these data types may directly expose sensitive and personal information. The severity values for particular data types may be predetermined for the system 100 based on the sensitivity associated with the data type or other factors, such as the frequency of use (e.g., usage of the data type for a group of users).

The method 200 may include the decision (240) if a mismatch has been determined by the privacy monitor 180. If the privacy monitor 180 determines that there is not a mismatch (e.g., the data type of the user input identified by the data type detector component 140 is part of the set of disclosed data types for the skill component 190*a*) then the method 200 may include continuing (245) the skill interaction. For instance, the privacy monitor 180 may send an indication to the orchestrator component 130 to continue.

Alternatively, if the privacy monitor 180 determined a mismatch, then at the decision (240) the method 200 may include storing (250) mismatch data. As described below in reference to FIG. 3, the mismatch data may be stored in a database. The mismatch data may include the detected data, a severity level indicator, a skill identifier corresponding to the skill component 190*a*, and/or dialog data (e.g., output generated by the skill component 190*a*). After storing the mismatch data the method 200 may proceed by continuing (245) the skill interactions.

In some embodiments, at decision 240 of the method 200, if a mismatch is determined then the method 200 may including sending (255) an alert to the user 105. The system 100 may be configured or a user preference may stored such that if the privacy monitor 180 determines a mismatch, then an output is generated to alert the user 105 that the user 105 is sharing sensitive data with the particular skill that may be unauthorized (e.g., the data type corresponding to the sensitive data has not previously been disclosed for the particular skill). In some embodiments, the method 200 may end at operation 255 and prevent the skill interaction from continuing and thus preventing the skill component 190*a* from receiving the sensitive data identified in the user input. In some embodiments, the operation 255 may generate a prompt asking the user 105 if they wish to continue (e.g., "This skill is not authorized to receive the information you provided, do you wish to continue?")

Figure 3:
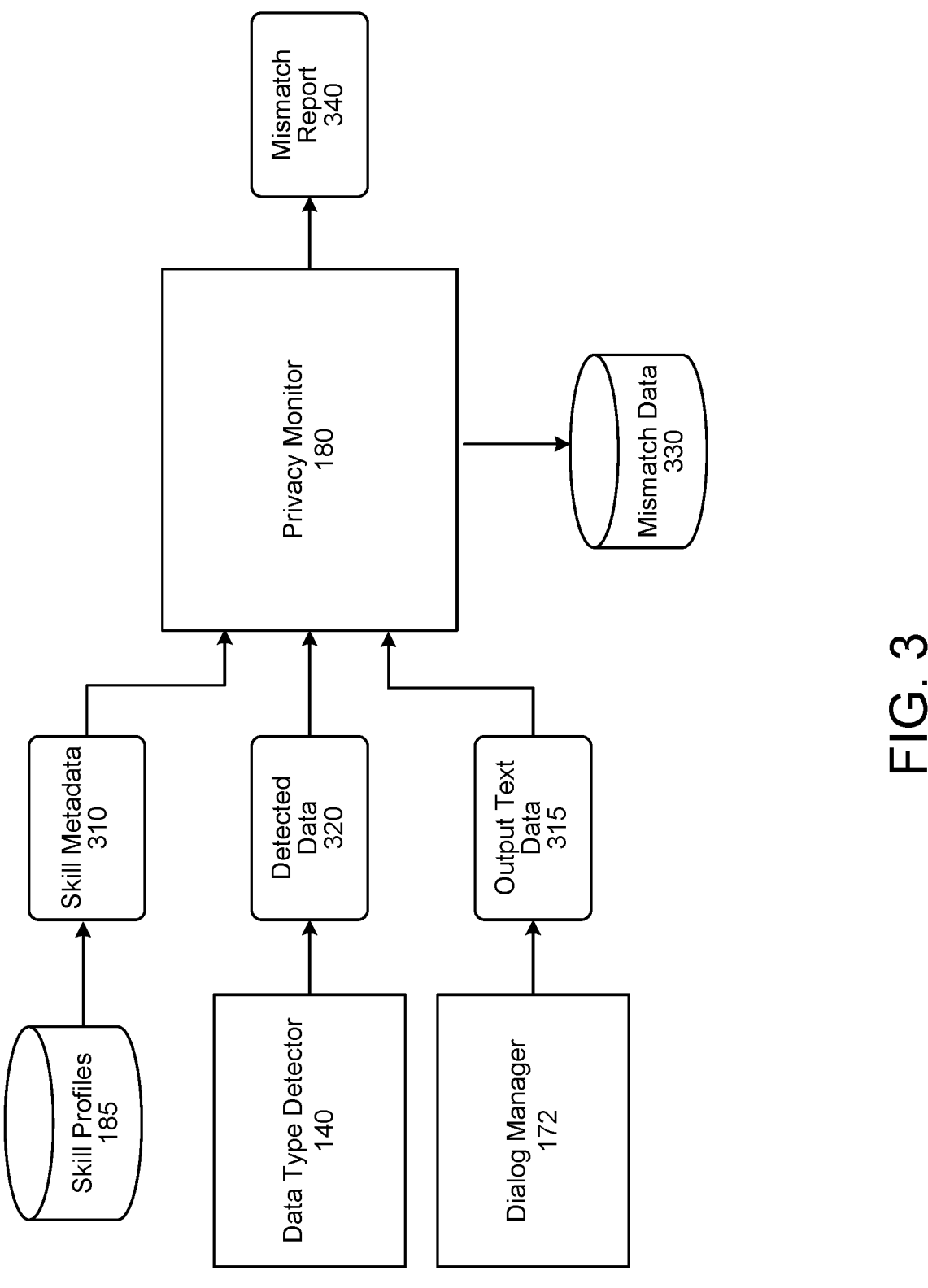
FIG. 3 is a conceptual diagram of a privacy monitor component configured to identify user data, according to embodiments of the present disclosure.

FIG. 3 is a conceptual diagram of a privacy monitor component 180 configured to identify user data, according to embodiments of the present disclosure. As described above in reference to FIGS. 1 and 2, a skill profile database 185 may provide skill metadata 310 for a skill component 190*a*, such as via the orchestrator 130, that identifies the data types collected by the particular skill of the skill component 190*a*. The skill metadata 310 may include a set of disclosed data types that the skill may request from the user 105, such as a home address for a pizza delivery skill or phone number for an appointment scheduling skill. The data type detector 140 may provide detected data 320 determined from the ASR data 810 and/or NLU results data 1085 generated from the spoken natural language user input. The dialog manager 172 may provide output text data 315 representing the output or dialog responses generated based on the output or actions of a particular skill component 190*a*, and as described in detail below in reference to FIG. 11.

The privacy monitor 180 may compare the label (e.g., credit card number, home address, etc.) of the detected data 320 to the set of disclosed data types of the skill metadata 310. If the privacy monitor 180 determines that the label corresponds with at least one data type of the set of disclosed data types, then no further actions are taken as the skill developers have previously disclosed that sensitive data corresponding to the detected data 320 is requested and used by the particular skill. If the privacy monitor determines the label of the detected data 320 does not correspond with at least one data type from the set of data types of the skill metadata 310, then a potential mismatch (e.g., unregistered collection of user data) may have occurred. The mismatch may be stored as mismatch data 330. The mismatch data stored for a mismatch may include the detected data, a severity level indicator, a skill identifier corresponding to the skill component 190*a*, and/or output text data 315 (e.g., output generated by the skill component 190*a*).

The mismatches stored in the mismatch data 330 may be aggregated, such as based on the particular skill, data type, and/or severity. The privacy monitor 180 may evaluate the aggregated mismatches against a threshold value to determine if the skill may be requesting user data not previously disclosed.

When a mismatch occurs and/or when the mismatch data is aggregated, the privacy monitor 180 may use the text data 315 to determine if the sensitive data provided in the user input was solicited by the particular skill component 190*a*. The privacy monitor 180 may determine if the text data 315 includes keywords or request phrases corresponding to the sensitive data (e.g., "Please state your phone number," "Please provide your birth date," etc.) If the privacy monitor 180 determines the text data 315 includes a request or solicitation for sensitive data then the mismatch may be aggregated with similar mismatches corresponding to the skill component 190*a*. A mismatch report 340 may be generated based on the aggregated mismatch data and provided to the skill developers and/or administrators of the virtual assistant system 100. In some instances, the text data 315 may include ambiguous requests (e.g., "Please provide your number") or requests with multiple meanings (e.g., "Please provide your address" may refer to home address, work address, email address, etc.). For such ambiguous or confusing requests, a similar mismatch report 340 may be generated to alert the skill developers and/or administrators of the virtual assistant system 100.

In some embodiments, when a mismatch report 340 is generated, such as based on the aggregated mismatch data exceeding a threshold value, the system 100 may pause the skill corresponding to the mismatch report 340. The generation of the mismatch report 340 may indicate that the corresponding particular skill is attempting to collect data that the particular skill is not authorized to collect. To prevent fraudulent access to sensitive data, the system 100 may pause functionality of the skill (e.g., user access to the skill) when a mismatch report 340 is generated.

If the privacy monitor 180 does not determine that the text data 315 includes a request or solicitation of data then the user 105 may have volunteered or mistakenly provided the sensitive data. While the skill component 190*a* may not have requested or solicited the sensitive data, the mismatch may be stored and aggregated with unsolicited mismatches to generate a mismatch report 340 of the unsolicited mismatches. The aggregated unsolicited mismatch data may be used to determine if the skill component 190*a* is generating misunderstood or confusing response outputs. For example, after receiving a mismatch report 340 that users are providing their social security number for a particular skill, the output responses (e.g., output text data 315) generated by the skill component 190*a* may be analyzed to determine that the skill component 190*a* is requesting users to provide their "social ID". It may be determined that this is being misinterpreted by users to provide their social security number.

In some embodiments, the privacy monitor 180 may train and use a machine learning model, or solicitation model. The solicitation model may comprise a machine learning component configured to process information about skill behaviors by receiving the skill interaction data (e.g., the output text data 315, dialog interaction data, etc.) with the users 105 and automatically classify the skill behaviors, such as based on solicitation and the data types requested. The solicitation model may be trained with mismatch data and non-mismatch data (e.g., the sensitive data collected is part of the set of disclosed data types). The solicitation model may be configured to recognize solicitations or requests for data output text data 315 generated from output of the skill component 190*a*. For example, the solicitation model may be trained to recognize the request "Please provide your CC number" or "Please provide your payment information" refers to a request for a credit card number. The solicitation model may generate output indicating if a skill response or request is a solicitation for a certain type of user data. The output of the solicitation model may include a confidence value corresponding to a percentage value of how likely this response is a solicitation as well as an indicator of the type of data being solicited.

In some embodiments, the privacy monitor 180 may be configured to receive, or intercept, output from a skill component 190a. For example, in response to a user input request (e.g., "Order a pizza from [pizza restaurant]"), the corresponding skill component 190a may generate a responsive output that is sent to the orchestrator 130 before being processed by the NLG 679 to generate a natural language response (e.g., "What toppings would you like on the pizza?"). In some embodiments, the privacy monitor 180 may be positioned to intercept the skill response, or requests, between the skill component 190a and the orchestrator 130. In some embodiments, the privacy monitor 180 may receive the natural language output generated by the NLG 679.

The privacy monitor 180 may receive the output requests from the skill component 190a. The privacy monitor 180 may be configured to determine whether the skill request from the skill component 190a, prior to generating the natural language request for output to the user, includes a request for sensitive data. For example, the skill component 190a may determine a response to request the user's phone number (e.g., "get phone number"). The NLG 679 may generate a natural language request from the received skill request (e.g., "Please provide your phone number"). The privacy monitor 180 may intercept the skill request from the skill component 190a and determine if the skill request includes one or more data types corresponding to sensitive data. Similar to operation 230 of the method 200, the privacy monitor 180 may receive metadata from the skill component 190a identifying the set of disclosed data types for the skill corresponding to skill component 190a. The privacy monitor 180 may determine whether the one or more data types identified in the skill request (e.g., "phone_number") are included in the set of disclosed data types. If the privacy monitor 180 determines that the data type is not included in the set of disclosed data types for the skill, then a mismatch may be generated. In some embodiments and based on determining the data type is not included in the set of disclosed data types, the privacy monitor 180 may prevent the skill request from being sent to the orchestrator component 130 and generating a natural language output based on the skill request.

FIG. 4 illustrates an example of a skill profile 400, according to embodiments of the present disclosure. The skill profile 400 includes elements that define a skill (e.g., the "[pizza restaurant]" skill). The data of the skill profile 400 may be stored in a data file and formatted, such as in using Extensible Markup Language (XML). The example illustrated in FIG. 4 may be similar to a formatted image of the skill profile 400 for display to a user. The skill profile database 185 may store one or more skill profiles, such as the example skill profile 400.

The skill profile 400 may include a general information section 405 and a data type collection section 410. The general information section 405 may include information about the skill such as the skill name and the skill category. The data type collection section 410 may include the different data types corresponding to PII or sensitive data that has been disclosed that is collected by the skill of the skill profile 400. The data type collection section 410 may separate the data types into different categories, such as location and financial information. The data types identified in the data type collection section 410 of the skill profile 400 may be the metadata provided to the privacy monitor 180 and as described above in relation to operation 230 of FIG. 2.

The example skill profile 400 illustrated in FIG. 4 is for a pizza delivery skill. A pizza delivery service may need location information, such as an address, for proper delivery of the pizza. The skill corresponding to the example skill profile 400 may request a delivery address from the user 105. However, as illustrated in the data type collection section 410, the skill profile 400 does not disclose that an address, or home address is one of the collected data types. Thus, when the skill component 190a corresponding to the example skill profile 400 requests a delivery address and the user 105 provides user input of an address, the privacy monitor 180 may determine a mismatch.

In some embodiments, the system 100 may be configured to generate a set of disclosed data types for skill based on the type of skill or application. For example and as illustrated in the general information section 405 of the example skill profile 400, the skill category is "Food_Delivery." The system 100 may populate the collected data types with the home address data type, credit card number data type, and name data type as these data types may be common for skills of the category "Food_Delivery." Similarly, a skill of the skill category "Weather" may have the collected data types populated with the "Approximate Location" data type.

Figure 5B:
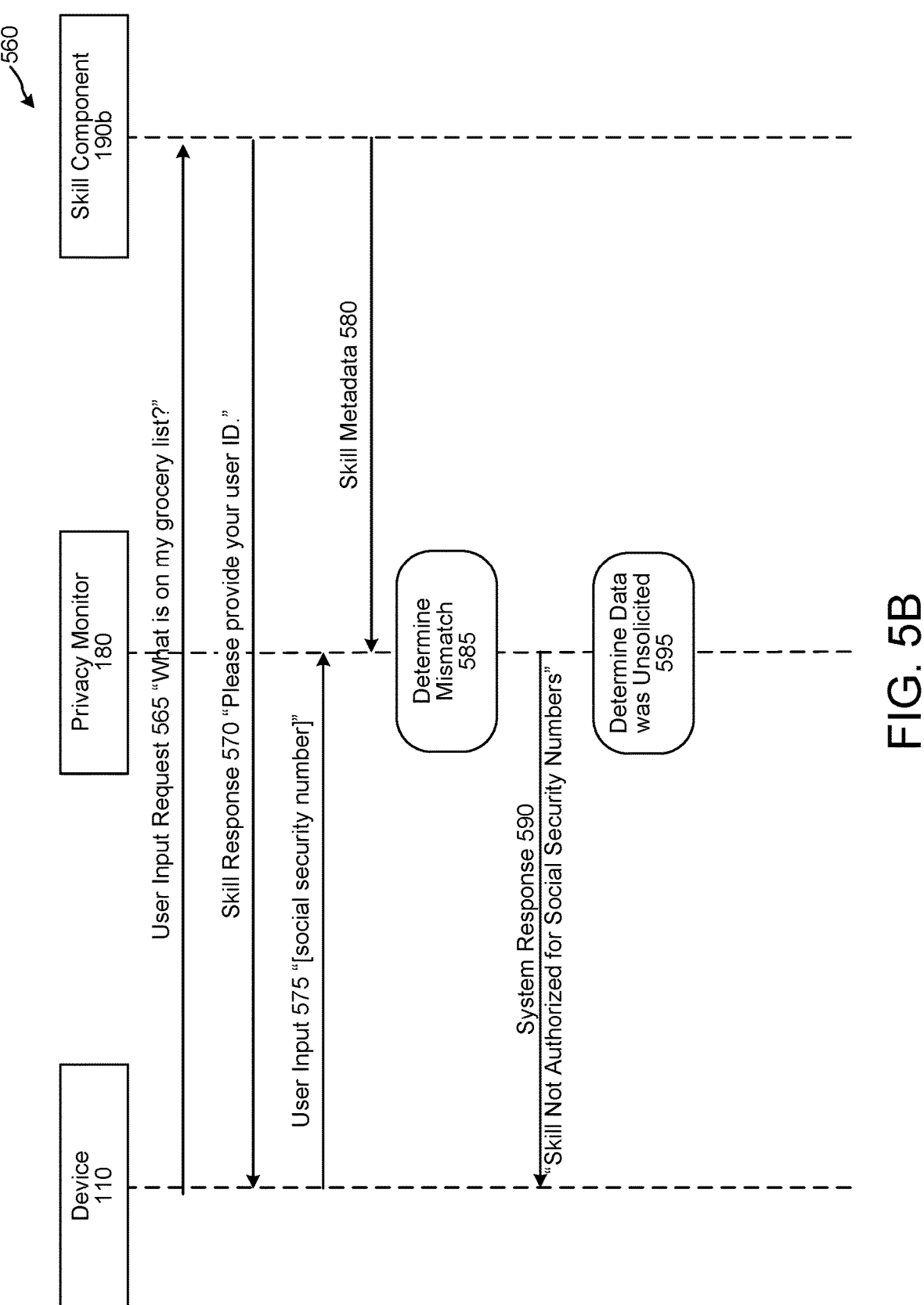

FIGS. 5A and 5B illustrate example exchanges of data during dialog session 500 and dialog session 560 with the virtual assistant system 100, according to embodiments of the present disclosure. The dialog session 500 and dialog session 560 illustrated in FIGS. 5A and 5B are general representations and do not include all the components that may be involved in such dialog sessions, such as the orchestrator component 130, data type detector component 140, etc. For dialog session 500 illustrated in FIG. 5A, the user 105 may desire to order a pizza and speaks an utterance to a device 110, such as the user input request 505 "I want to order a pizza from [pizza restaurant]." The orchestrator component 130 may direct the user input request 505 to a skill component 190a corresponding with the [pizza restaurant] skill and corresponding to the skill profile illustrated in FIG. 4.

As part of the dialog session 500, the skill component 190a may generate the skill response 510, such as a request for the user's phone number (e.g., "what is your phone number?") In response, the user 105 may provide user input 515 of their phone number. The user input 515 may be received by the privacy monitor 180 to determine if the user input 515 includes sensitive data that may not be disclosed and/or authorized for the skill component 190a. As described above in reference to FIG. 2, the data type detector component 140 may generate detected phrase data that identifies sensitive data types in user input. The detected data is then received by the privacy monitor 180.

The privacy monitor 180 may receive, from the skill component 190a, skill metadata 520 identifying the registered data types, or set of disclosed data types (such as illustrated in the data type collection section 410 of FIG. 4) for the skill. At operation 525, the privacy monitor 180 may compare the user input 515 and skill metadata 520 (and similar to the process described in reference to operation 235) to determine if a mismatch is present. For the example dialog session 500, a mismatch is not present as the phone number data type is registered, or included in the set of disclosed data types of the skill component 190a (and as shown in data type collection section 410). Thus, the privacy monitor 180 permits the user input 530 representing the provided phone number to be sent to the skill component 190a.

The skill component 190a may then generate the skill response 535 requesting the user's home address (e.g., "What is your home address?") In response, the user 105 may provide user input 540 with their home address. Similar to operation 525, at operation 545 the privacy monitor 180 may compare the user input 540 and the skill metadata 520 (the skill metadata 520 may be stored by the privacy monitor 180 during a dialog session) to determine if a mismatch is present. For the example dialog session 500, a violation is present as the home address data type is unregistered, or not part of the set of disclosed data types for the skill component 190*a* (and as shown in data type collection section 410). In the example of the skill for pizza delivery (e.g., a "[pizza restaurant]" skill), a user's address is needed for completing the transaction and, in most cases, will be requested with each transaction of the skill. The privacy monitor 180 may generate a report (e.g., mismatch report 340) that is sent to the skill developers. The skill developers may then update the skill profile to include the home address as a collected data type.

In the embodiment illustrated in dialog session 500, the system 100 is configured to prevent skill component(s) 190 from receiving user inputs including sensitive data types which have not been disclosed for collection by the skill. Thus, the privacy monitor 180 may generate a system response 550 alerting the user 105 that the skill is not authorized for the mismatched data type (e.g., "Skill is not authorized to receive addresses").

For dialog session 560 illustrated in FIG. 5B, the user 105 may desire to check the items on grocery list that corresponds with a grocery ordering skill. The user may speak an utterance to the device 110, such as the user input request 565 "What is on my grocery list?" The orchestrator component 130 may direct the user input request 565 to a skill component 190*b* corresponding with the grocery ordering skill.

As part of the dialog session 560, the skill component 190*b* may generate the skill response 570, such as a request for the user ID (e.g., "Please provide your user ID"), so that the skill component 190*b* may access the grocery account for the user. In response, the user 105 may provide user input 575. However, in the example dialog session 560, the user misunderstands what the "user ID" is and instead provides their social security number. The user input 575 may be received by the privacy monitor 180 to determine if the user input 575 includes sensitive data that may not be disclosed and/or authorized for the skill component 190*b*. As described above in reference to FIG. 2, the data type detector component 140 may generate detected data that identifies sensitive data types in user input. For example, in the dialog session 560, the data type detector component 140 may identify that the user input 575 includes a representation corresponding to a social security number and identify it as such. The detected data is then received by the privacy monitor 180.

The privacy monitor 180 may receive, from the skill component 190*b*, skill metadata 580 identifying the set of disclosed data types for the grocery shopping skill. At operation 585, the privacy monitor 180 may compare the user input 575 and skill metadata 580 (and similar to the process described in reference to operation 235) to determine if a mismatch is present. For the example dialog session 560, a mismatch is present as a user's social security number is not included in the set of disclosed data types of the skill component 19*b*, nor was the user's social security number requested by the grocery shopping skill.

In the embodiment illustrated in dialog session 560, the system 100 may configured to prevent skill component(s) 190 from receiving user inputs including sensitive data types which have not been disclosed for collection by the skill.

Thus, the privacy monitor 180 may generate a system response 590 alerting the user that the skill is not authorized for the mismatched data type (e.g., "Skill is not authorized for Social Security numbers"). In some embodiments, the privacy monitor 180 may determine, at operation 595, if the violating sensitive data was unsolicited. For example, the privacy monitor 180 may provide the preceding output (e.g., skill response 570) to a solicitation model as input. The solicitation model may determine if the skill response 570 is a request for sensitive user data and, in some instances, the one or more data types that the skill response 570 may be soliciting. In some embodiments, the privacy monitor 180 may generate a report identifying the skill response 570 and the one or more violating data types received in response to the skill response 570.

In some embodiments, the methods and techniques described herein may be used to identify skills which are fraudulent or are designed to facilitate a scam. For example, ne'er-do-well skill developers may submit a skill for creating to-do lists to the system 100. The skill profile for the skill may identify minimal data types collected, such as the name of the user. However, the skill may actually be configured to request additional sensitive data, such as birth dates and credit card numbers. As described above, the privacy monitor 180 may identify when such sensitive data is provided by the user but the corresponding data types are not included in the skill profile. The privacy monitor 180 may aggregate the mismatches and it may be determined that the skill is attempting to collect sensitive data inapplicable to such a skill. In some embodiments, the privacy monitor 180 may be configured to prevent violating sensitive data from being sent to the skill component 190*a* of the fraudulent skill.

Figure 6:
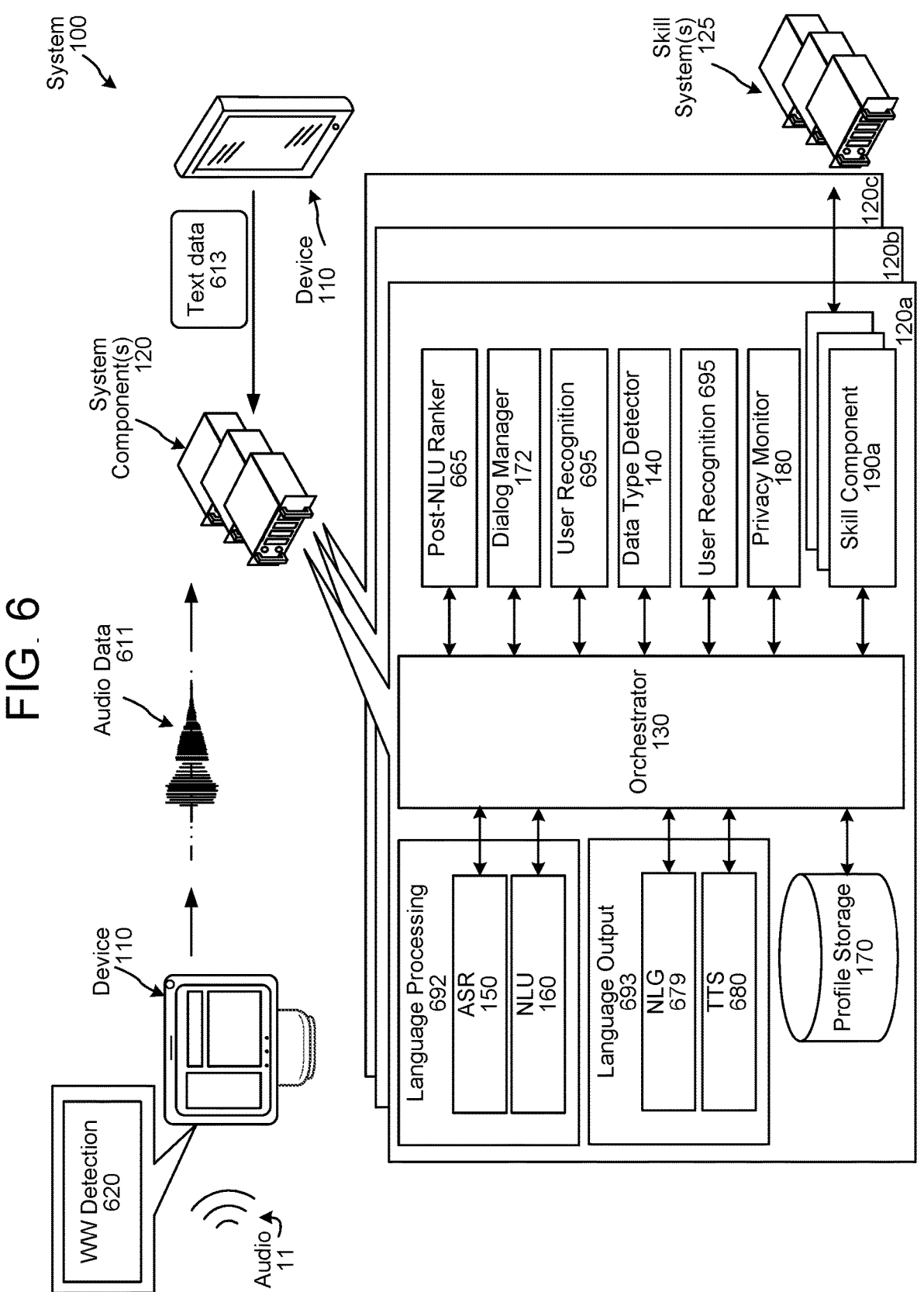
FIG. 6 is a conceptual diagram of components of the system, according to embodiments of the present disclosure.

The system 100 may operate using various components as described in FIG. 6. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system component(s) 120. In at least some embodiments, such determination may be made using a wakeword detection component 620. The wakeword detection component 620 may be configured to detect various wakewords. In at least some examples, each wakeword may correspond to a name of a different digital assistant. An example wakeword/digital assistant name is "Alexa." In another example, input to the system may be in form of text data 613, for example as a result of a user typing an input into a user interface of device 110. Other input forms may include indication that the user has pressed a physical or virtual button on device 110, the user has made a gesture, etc.

The wakeword detector 620 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 620 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 620 and/or input is detected by an input detector, the device 110 may "wake" and begin transmitting audio data 611, representing the audio 11, to the system component(s) 120. The audio data 611 may include data corresponding to the wakeword; in other embodiments, the portion of the audio corresponding to the wakeword is removed by the device 110 prior to sending the audio data 611 to the system component(s) 120. In the case of touch input detection or gesture based input detection, the audio data may not include a wakeword.

In some implementations, the system 100 may include more than one system component(s) 120. The system components 120 may respond to different wakewords and/or perform different categories of tasks. Each system component(s) 120 may be associated with its own wakeword such that speaking a certain wakeword results in audio data being sent to and processed by a particular system. For example, detection of the wakeword "Alexa" by the wakeword detector 620 may result in sending audio data to system component 120a for processing while detection of the wakeword "Computer" by the wakeword detector may result in sending audio data to system component 120b for processing. The system may have a separate wakeword and system for different skills/systems (e.g., "Dungeon Master" for a game play skill/system component 120c) and/or such skills/systems may be coordinated by one or more skill(s) 190 of one or more system components 120.

Upon receipt by the system component(s) 120, the audio data 611 may be sent to an orchestrator component 130. The orchestrator component 130 may include memory and logic that enables the orchestrator component 130 to transmit various pieces and forms of data to various components of the system, as well as perform other operations as described herein.

The orchestrator component 130 may send the audio data 611 to a language processing component 692. The language processing component 692 (sometimes also referred to as a spoken language understanding (SLU) component) includes an automatic speech recognition (ASR) component 150 and a natural language understanding (NLU) component 160. The ASR component 150 may transcribe the audio data 611 into text data. The text data output by the ASR component 150 represents one or more than one (e.g., in the form of an N-best list) ASR hypotheses representing speech represented in the audio data 611. The ASR component 150 interprets the speech in the audio data 611 based on a similarity between the audio data 611 and pre-established language models. For example, the ASR component 150 may compare the audio data 611 with models for sounds (e.g., acoustic units such as phonemes, senons, phones, etc.) and sequences of sounds to identify words that match the sequence of sounds of the speech represented in the audio data 611. The ASR component 150 sends the text data generated thereby to an NLU component 160, via, in some embodiments, the orchestrator component 130. The text data sent from the ASR component 150 to the NLU component 160 may include a single top-scoring ASR hypothesis or may include an N-best list including multiple top-scoring ASR hypotheses. An N-best list may additionally include a respective score associated with each ASR hypothesis represented therein. The ASR component 150 is described in greater detail below with regard to FIG. 8.

The speech processing system 692 may further include a NLU component 160. The NLU component 160 may receive the text data from the ASR component. The NLU component 160 may attempts to make a semantic interpretation of the phrase(s) or statement(s) represented in the text data input therein by determining one or more meanings associated with the phrase(s) or statement(s) represented in the text data. The NLU component 160 may determine an intent representing an action that a user desires be performed and may determine information that allows a device (e.g., the device 110, the system component(s) 120, a skill component 190, a skill system(s) 125, etc.) to execute the intent. For example, if the text data corresponds to "play the 5$^{th}$ Symphony by Beethoven," the NLU component 160 may determine an intent that the system output music and may identify "Beethoven" as an artist/composer and "5th Symphony" as the piece of music to be played. For further example, if the text data corresponds to "what is the weather," the NLU component 160 may determine an intent that the system output weather information associated with a geographic location of the device 110. In another example, if the text data corresponds to "turn off the lights," the NLU component 160 may determine an intent that the system turn off lights associated with the device 110 or the user 5. However, if the NLU component 160 is unable to resolve the entity—for example, because the entity is referred to by anaphora such as "this song" or "my next appointment"— the speech processing system 692 can send a decode request to another speech processing system 692 for information regarding the entity mention and/or other context related to the utterance. The speech processing system 692 may augment, correct, or base results data upon the audio data 611 as well as any data received from the other speech processing system 692.

The NLU component 160 may return NLU results data 1085/1025 (which may include tagged text data, indicators of intent, etc.) back to the orchestrator 130. The orchestrator 130 may forward the NLU results data to a skill component(s) 190. If the NLU results data includes a single NLU hypothesis, the NLU component 160 and the orchestrator component 130 may direct the NLU results data to the skill component(s) 190 associated with the NLU hypothesis. If the NLU results data 1085/1025 includes an N-best list of NLU hypotheses, the NLU component 160 and the orchestrator component 130 may direct the top scoring NLU hypothesis to a skill component(s) 190 associated with the top scoring NLU hypothesis. The system may also include a post-NLU ranker 665 which may incorporate other information to rank potential interpretations determined by the NLU component 160. The local device 110 may also include its own post-NLU ranker, which may operate similarly to the post-NLU ranker 665. The NLU component 160, post-NLU ranker 665 and other components are described in greater detail below with regard to FIGS. 9 and 10.

A skill component may be software running on the system component(s) 120 that is akin to a software application. That is, a skill component 190 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 190. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 190 may operate in conjunction between the system component(s) 120 and other devices, such as the device 110, in order to complete certain functions. Inputs to a skill component 190 may come from speech processing interactions or through other interactions or input sources. A skill component 190 may include hardware, software, firmware, or the like that may be dedicated to a particular skill component 190 or shared among different skill components 190.

A skill support system(s) 125 may communicate with a skill component(s) 190 within the system component(s) 120 and/or directly with the orchestrator component 130 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system component(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 190 dedicated to interacting with the skill support system(s) 125. Unless expressly stated otherwise, reference to a skill, skill device, or skill component may include a skill component 190 operated by the system component(s) 120 and/or skill operated by the skill support system(s) 125. Moreover, the functionality described herein as a skill or skill may be referred to using many different terms, such as an action, bot, app, or the like. The skill 190 and or skill support system(s) 125 may return output data to the orchestrator 130.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 172 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 172 may associate a dialog session identifier with the dialog upon identifying that the user is engaging in a dialog with the user. The dialog manager component 172 may track a user input and the corresponding system generated response to the user input as a turn. The dialog session identifier may correspond to multiple turns of user input and corresponding system generated response. The dialog manager component 172 may transmit data identified by the dialog session identifier directly to the orchestrator component 130 or other component. Depending on system configuration the dialog manager 172 may determine the appropriate system generated response to give to a particular utterance or user input of a turn. Or creation of the system generated response may be managed by another component of the system (e.g., the language output component 693, NLG 679, orchestrator 130, etc.) while the dialog manager 172 selects the appropriate responses. Alternatively, another component of the system component(s) 120 may select responses using techniques discussed herein. The text of a system generated response may be sent to a TTS component 680 for creation of audio data corresponding to the response. The audio data may then be sent to a user device (e.g., device 110) for ultimate output to the user. Alternatively (or in addition) a dialog response may be returned in text or some other form.

The dialog manager 172 may receive the ASR hypothesis/hypotheses (i.e., text data) and make a semantic interpretation of the phrase(s) or statement(s) represented therein. That is, the dialog manager 172 determines one or more meanings associated with the phrase(s) or statement(s) represented in the text data based on words represented in the text data. The dialog manager 172 determines a goal corresponding to an action that a user desires be performed as well as pieces of the text data that allow a device (e.g., the device 110, the system component(s) 120, a skill 190, a skill system(s) 125, etc.) to execute the intent. If, for example, the text data corresponds to "what is the weather," the dialog manager 172 may determine that that the system component(s) 120 is to output weather information associated with a geographic location of the device 110. In another example, if the text data corresponds to "turn off the lights," the dialog manager 172 may determine that the system component(s) 120 is to turn off lights associated with the device(s) 110 or the user(s) 5.

The dialog manager 172 may send the results data to one or more skill(s) 190. If the results data includes a single hypothesis, the orchestrator component 130 may send the results data to the skill(s) 190 associated with the hypothesis. If the results data includes an N-best list of hypotheses, the orchestrator component 130 may send the top scoring hypothesis to a skill(s) 190 associated with the top scoring hypothesis.

The system component(s) 120 includes a language output component 693. The language output component 693 includes a natural language generation (NLG) component 679 and a text-to-speech (TTS) component 680. The NLG component 679 can generate text for purposes of TTS output to a user. For example the NLG component 679 may generate text corresponding to instructions corresponding to a particular action for the user to perform. The NLG component 679 may generate appropriate text for various outputs as described herein. The NLG component 679 may include one or more trained models configured to output text appropriate for a particular input. The text output by the NLG component 679 may become input for the TTS component 680 (e.g., output text data 315 discussed below). Alternatively or in addition, the TTS component 680 may receive text data from a skill 190 or other system component for output.

The NLG component 679 may include a trained model. The NLG component 679 generates text data 315 from dialog data received by the dialog manager 172 such that the output text data 315 has a natural feel and, in some embodiments, includes words and/or phrases specifically formatted for a requesting individual. The NLG may use templates to formulate responses. And/or the NLG system may include models trained from the various templates for forming the output text data 315. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 680.

The TTS component 680 may generate audio data (e.g., synthesized speech) from text data using one or more different methods. Text data input to the TTS component 680 may come from a skill component 190, the orchestrator component 130, or another component of the system. In one method of synthesis called unit selection, the TTS component 680 matches text data against a database of recorded speech. The TTS component 680 selects matching units of recorded speech and concatenates the units together to form audio data. In another method of synthesis called parametric synthesis, the TTS component 680 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system component(s) 120 as image data. The device 110 may further include circuitry for voice command-based control of the camera, allowing a user 5 to request capture of image or video data. The device 110 may process the commands locally or send audio data 611 representing the commands to the system component(s) 120 for processing, after which the system component(s) 120 may return output data that can cause the device 110 to engage its camera.

The system component(s) 120 may include a user recognition component 695 that recognizes one or more users using a variety of data. However, the disclosure is not limited thereto, and the device 110 may include a user recognition component 795 instead of and/or in addition to user recognition component 695 of the system component(s)

120 without departing from the disclosure. User recognition component 795 operates similarly to user recognition component 695.

The user-recognition component 695 may take as input the audio data 611 and/or text data output by the ASR component 150. The user-recognition component 695 may perform user recognition by comparing audio characteristics in the audio data 611 to stored audio characteristics of users. The user-recognition component 695 may also perform user recognition by comparing biometric data (e.g., fingerprint data, iris data, etc.), received by the system in correlation with the present user input, to stored biometric data of users assuming user permission and previous authorization. The user-recognition component 695 may further perform user recognition by comparing image data (e.g., including a representation of at least a feature of a user), received by the system in correlation with the present user input, with stored image data including representations of features of different users. The user-recognition component 695 may perform additional user recognition processes, including those known in the art.

The user-recognition component 695 determines scores indicating whether user input originated from a particular user. For example, a first score may indicate a likelihood that the user input originated from a first user, a second score may indicate a likelihood that the user input originated from a second user, etc. The user-recognition component 695 also determines an overall confidence regarding the accuracy of user recognition operations.

Output of the user-recognition component 695 may include a single user identifier corresponding to the most likely user that originated the user input. Alternatively, output of the user-recognition component 695 may include an N-best list of user identifiers with respective scores indicating likelihoods of respective users originating the user input. The output of the user-recognition component 695 may be used to inform NLU processing as well as processing performed by other components of the system.

The system 100 (either on device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 170 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 170 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 7:
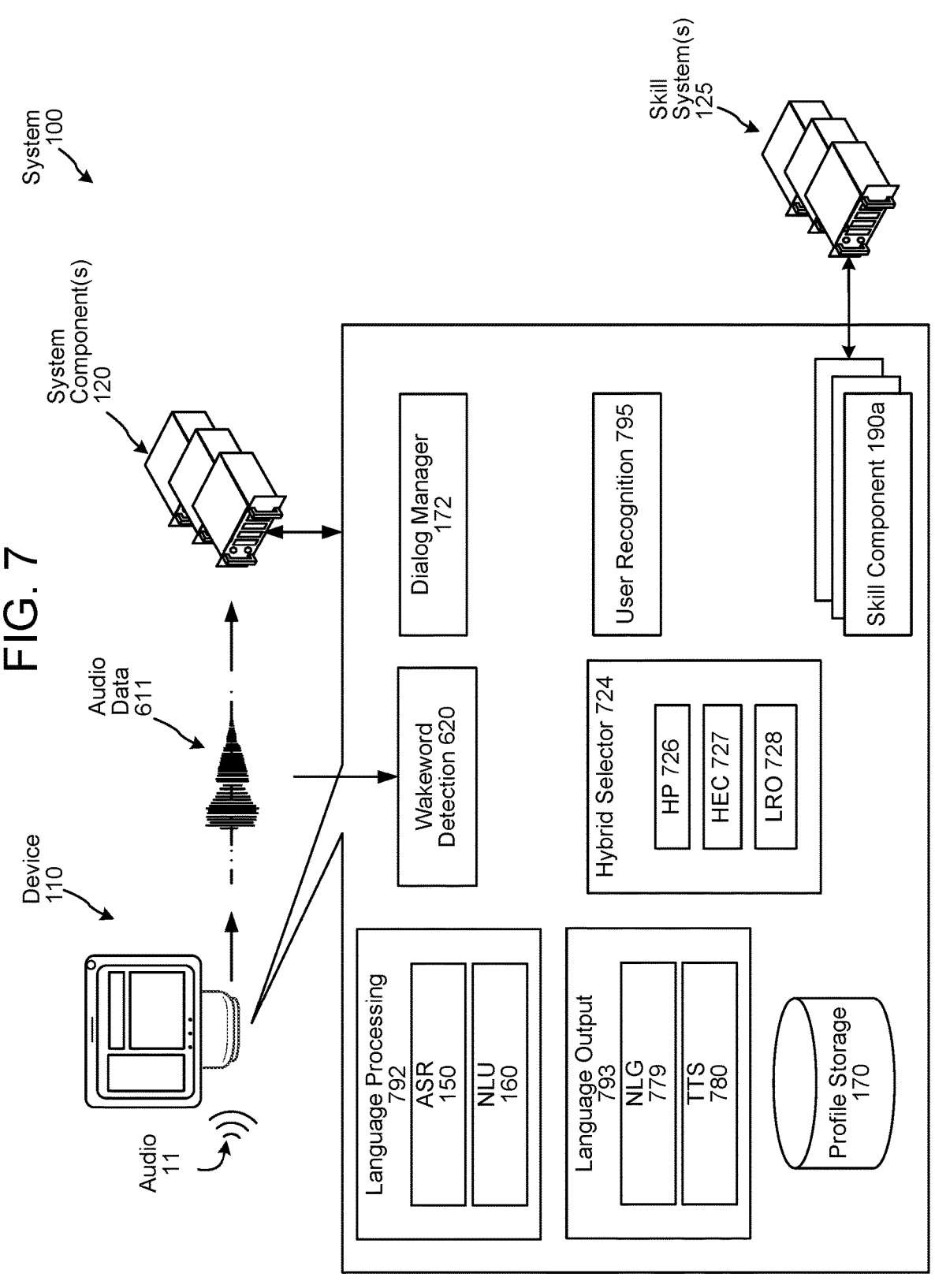
FIG. 7 is a conceptual diagram illustrating components that may be included in a device, according to embodiments of the present disclosure.

Although the components of FIG. 6 may be illustrated as part of system component(s) 120, device 110, or otherwise, the components may be arranged in other device(s) (such as in device 110 if illustrated in system component(s) 120 or vice-versa, or in other device(s) altogether) without departing from the disclosure. FIG. 7 illustrates such a configured device 110.

In at least some embodiments, the system component(s) 120 may receive the audio data 611 from the device 110, to recognize speech corresponding to a spoken input in the received audio data 611, and to perform functions in response to the recognized speech. In at least some embodiments, these functions involve sending directives (e.g., commands), from the system component(s) 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the device 110 to output an audible response (e.g., using TTS processing performed by an on-device TTS component 780) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 6, the device 110 may include a wakeword detection component 620 configured to compare the audio data 611 to stored models used to detect a wakeword (e.g., "Alexa") that indicates to the device 110 that the audio data 611 is to be processed for determining NLU output data (e.g., slot data that corresponds to a named entity, label data, and/or intent data, etc.). In at least some embodiments, a hybrid selector 724, of the device 110, may send the audio data 611 to the wakeword detection component 620. If the wakeword detection component 620 detects a wakeword in the audio data 611, the wakeword detection component 620 may send an indication of such detection to the hybrid selector 724. In response to receiving the indication, the hybrid selector 724 may send the audio data 611 to the system component(s) 120 and/or the ASR component 150. The wakeword detection component 620 may also send an indication, to the hybrid selector 724, representing a wakeword was not detected. In response to receiving such an indication, the hybrid selector 724 may refrain from sending the audio data 611 to the system component(s) 120, and may prevent the ASR component 150 from further processing the audio data 611. In this situation, the audio data 611 can be discarded.

The device 110 may conduct its own speech processing using on-device language processing components, such as an SLU/language processing component 792 (which may include an ASR component 150 and an NLU 160), similar to the manner discussed herein with respect to the SLU component 692 (or ASR component 150 and the NLU component 160) of the system component(s) 120. Language processing component 792 may operate similarly to language processing component 692, ASR component 150 may operate similarly to ASR component 150 and NLU component 160 may operate similarly to NLU component 160. The device 110 may also internally include, or otherwise have access to, other components such as one or more skill components 190 capable of executing commands based on NLU output data or other results determined by the device 110/system component(s) 120 (which may operate similarly to skill components 190), a user recognition component 795 (configured to process in a similar manner to that discussed herein with respect to the user recognition component 695 of the system component(s) 120), profile storage 170 (configured to store similar profile data to that discussed herein with respect to the profile storage 170 of the system component(s) 120), or other components. In at least some embodiments, the profile storage 170 may only store profile data for a user or group of users specifically associated with the device 110. Similar to as described above with respect to skill component 190, a skill component 190 may communicate with a skill system(s) 125. The device 110 may also have its own language output component which may include NLG component 779 and TTS component 780. Language output component may operate similarly to language processing component 693, NLG component 779 may operate similarly to NLG component 679 and TTS component 780 may operate similarly to TTS component 680.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system component(s) 120.

The hybrid selector 724, of the device 110, may include a hybrid proxy (HP) 726 configured to proxy traffic to/from the system component(s) 120. For example, the HP 726 may be configured to send messages to/from a hybrid execution controller (HEC) 727 of the hybrid selector 724. For example, command/directive data received from the system component(s) 120 can be sent to the HEC 727 using the HP 726. The HP 726 may also be configured to allow the audio data 611 to pass to the system component(s) 120 while also receiving (e.g., intercepting) this audio data 611 and sending the audio data 611 to the HEC 727.

In at least some embodiments, the hybrid selector 724 may further include a local request orchestrator (LRO) 728 configured to notify the ASR component 150 about the availability of new audio data 611 that represents user speech, and to otherwise initiate the operations of local language processing when new audio data 611 becomes available. In general, the hybrid selector 724 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system component(s) 120 and chooses to use that remotely-determined directive data.

Thus, when the audio data 611 is received, the HP 726 may allow the audio data 611 to pass through to the system component(s) 120 and the HP 726 may also input the audio data 611 to the on-device ASR component 150 by routing the audio data 611 through the HEC 727 of the hybrid selector 724, whereby the LRO 728 notifies the ASR component 150 of the audio data 611. At this point, the hybrid selector 724 may wait for response data from either or both of the system component(s) 120 or the local language processing components. However, the disclosure is not limited thereto, and in some examples the hybrid selector 724 may send the audio data 611 only to the local ASR component 150 without departing from the disclosure. For example, the device 110 may process the audio data 611 locally without sending the audio data 611 to the system component(s) 120.

The local ASR component 150 is configured to receive the audio data 611 from the hybrid selector 724, and to recognize speech in the audio data 611, and the local NLU component 160 is configured to determine a user intent from the recognized speech, and to determine how to act on the user intent by generating NLU output data which may include directive data (e.g., instructing a component to perform an action). Such NLU output data may take a form similar to that as determined by the NLU component 160 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 160) may be selected as usable to respond to a natural language user input, and local response data may be sent (e.g., local NLU output data, local knowledge base information, internet search results, and/or local directive data) to the hybrid selector 724, such as a "ReadyToExecute" response. The hybrid selector 724 may then determine whether to use directive data from the on-device components to respond to the natural language user input, to use directive data received from the system component(s) 120, assuming a remote response is even received (e.g., when the device 110 is able to access the system component(s) 120 over the network(s) 199), or to determine output audio requesting additional information from the user 5.

The device 110 and/or the system component(s) 120 may associate a unique identifier with each natural language user input. The device 110 may include the unique identifier when sending the audio data 611 to the system component(s) 120, and the response data from the system component(s) 120 may include the unique identifier to identify which natural language user input the response data corresponds.

In at least some embodiments, the device 110 may include, or be configured to use, one or more skill components 190 that may work similarly to the skill component(s) 190 implemented by the system component(s) 120. The skill component(s) 190 may correspond to one or more domains that are used in order to determine how to act on a spoken input in a particular way, such as by outputting a directive that corresponds to the determined intent, and which can be processed to implement the desired operation. The skill component(s) 190 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device

110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 190, a skill system 125, or a combination of a skill component 190 and a corresponding skill system 125.

Similar to the manner discussed with regard to FIG. 6, the local device 110 may be configured to recognize multiple different wakewords and/or perform different categories of tasks depending on the wakeword. Such different wakewords may invoke different processing components of local device 110 (not illustrated in FIG. 7). For example, detection of the wakeword "Alexa" by the wakeword detector 620 may result in sending audio data to certain language processing components 792/skills 190 for processing while detection of the wakeword "Computer" by the wakeword detector may result in sending audio data different language processing components 792/skills 190 for processing.

FIG. 8 is a conceptual diagram of an ASR component 150, according to embodiments of the present disclosure. The ASR component 150 may interpret a spoken natural language input based on the similarity between the spoken natural language input and pre-established language models 854 stored in an ASR model storage 852. For example, the ASR component 150 may compare the audio data with models for sounds (e.g., subword units or phonemes) and sequences of sounds to identify words that match the sequence of sounds spoken in the natural language input. Alternatively, the ASR component 150 may use a finite state transducer (FST) 855 to implement the language model functions.

When the ASR component 150 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 853 stored in the ASR model storage 852), and the likelihood that a particular word, which matches the sounds, would be included in the sentence at the specific location (e.g., using a language or grammar model 854). Based on the considered factors and the assigned confidence score, the ASR component 150 may output an ASR hypothesis that most likely matches the spoken natural language input, or may output multiple ASR hypotheses in the form of a lattice or an N-best list, with each ASR hypothesis corresponding to a respective score.

The ASR component 150 may include a speech recognition engine 858. The ASR component 150 receives audio data 611 (for example, received from a local device 110 having processed audio detected by a microphone by an acoustic front end (AFE) or other component). The speech recognition engine 858 compares the audio data 611 with acoustic models 853, language models 854, FST(s) 855, and/or other data models and information for recognizing the speech conveyed in the audio data. The audio data 611 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data may arrive at the supporting device(s) 120 encoded, in which case they may be decoded by the speech recognition engine 858 and/or prior to processing by the speech recognition engine 858.

In some implementations, the ASR component 150 may process the audio data 611 using the ASR model 850. The ASR model 850 may be, for example, a recurrent neural network such as an RNN-T. An example RNN-T architecture is illustrated in FIG. 8. The ASR model 850 may predict a probability (y|x) of labels $y=(y_1, \ldots, y_u)$ given acoustic features $x=(x_1, \ldots, x_t)$. During inference, the ASR model 850 can generate an N-best list using, for example, a beam search decoding algorithm. The ASR model 850 may include an encoder 812, a prediction network 820, a joint network 830, and a softmax 840. The encoder 812 may be similar or analogous to an acoustic model (e.g., similar to the acoustic model 853 described below), and may process a sequence of acoustic input features to generate encoded hidden representations. The prediction network 820 may be similar or analogous to a language model (e.g., similar to the language model 854 described below), and may process the previous output label predictions, and map them to corresponding hidden representations. The joint network 830 may be, for example, a feed forward neural network (NN) that may process hidden representations from both the encoder 812 and prediction network 820, and predict output label probabilities. The softmax 840 may be a function implemented (e.g., as a layer of the joint network 830) to normalize the predicted output probabilities.

The speech recognition engine 858 may process the audio data 611 with reference to information stored in the ASR model storage 852. Feature vectors of the audio data 611 may arrive at the system component(s) 120 encoded, in which case they may be decoded prior to processing by the speech recognition engine 858.

The speech recognition engine 858 attempts to match received feature vectors to language acoustic units (e.g., phonemes) and words as known in the stored acoustic models 853, language models 6B54, and FST(s) 855. For example, audio data 611 may be processed by one or more acoustic model(s) 853 to determine acoustic unit data. The acoustic unit data may include indicators of acoustic units detected in the audio data 611 by the ASR component 150. For example, acoustic units can consist of one or more phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 854 (and/or using FST 855) to determine ASR data 810. The ASR data 810 can include one or more hypotheses. One or more of the hypotheses represented in the ASR data 810 may then be sent to further components (such as the NLU component 160) for further processing as discussed herein. The ASR data 810 may include representations of text of an utterance, such as words, subword units, or the like.

The speech recognition engine 858 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 150 will output ASR hypotheses that make sense grammatically. The specific models used may be general models or may be models corresponding to a particular domain, such as music, banking, etc.

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 858 may use the acoustic model(s) 853 to attempt to match received audio feature vectors to words or subword acoustic units. An acoustic unit may be a senone, phoneme, phoneme in context, syllable, part of a syllable, syllable in context, or any other such portion of a word. The speech recognition engine 858 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 150 outputs ASR hypotheses that make sense grammatically.

The speech recognition engine 858 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 858, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 858 may also compute scores of branches of the paths based on language models or grammars. Language modeling involves determining scores for what words are likely to be used together to form coherent words and sentences. Application of a language model may improve the likelihood that the ASR component 150 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 9:
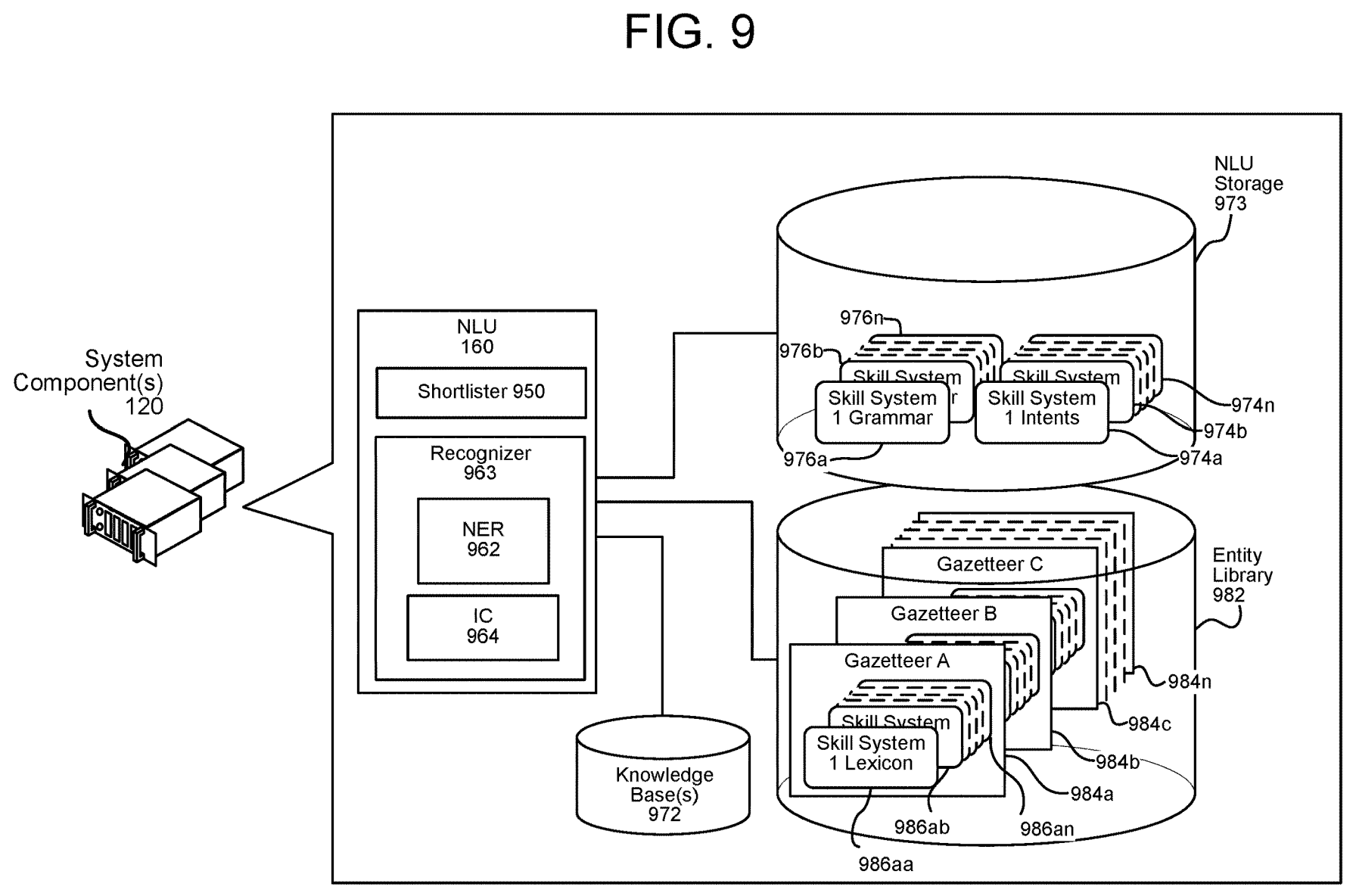
Figure 10:
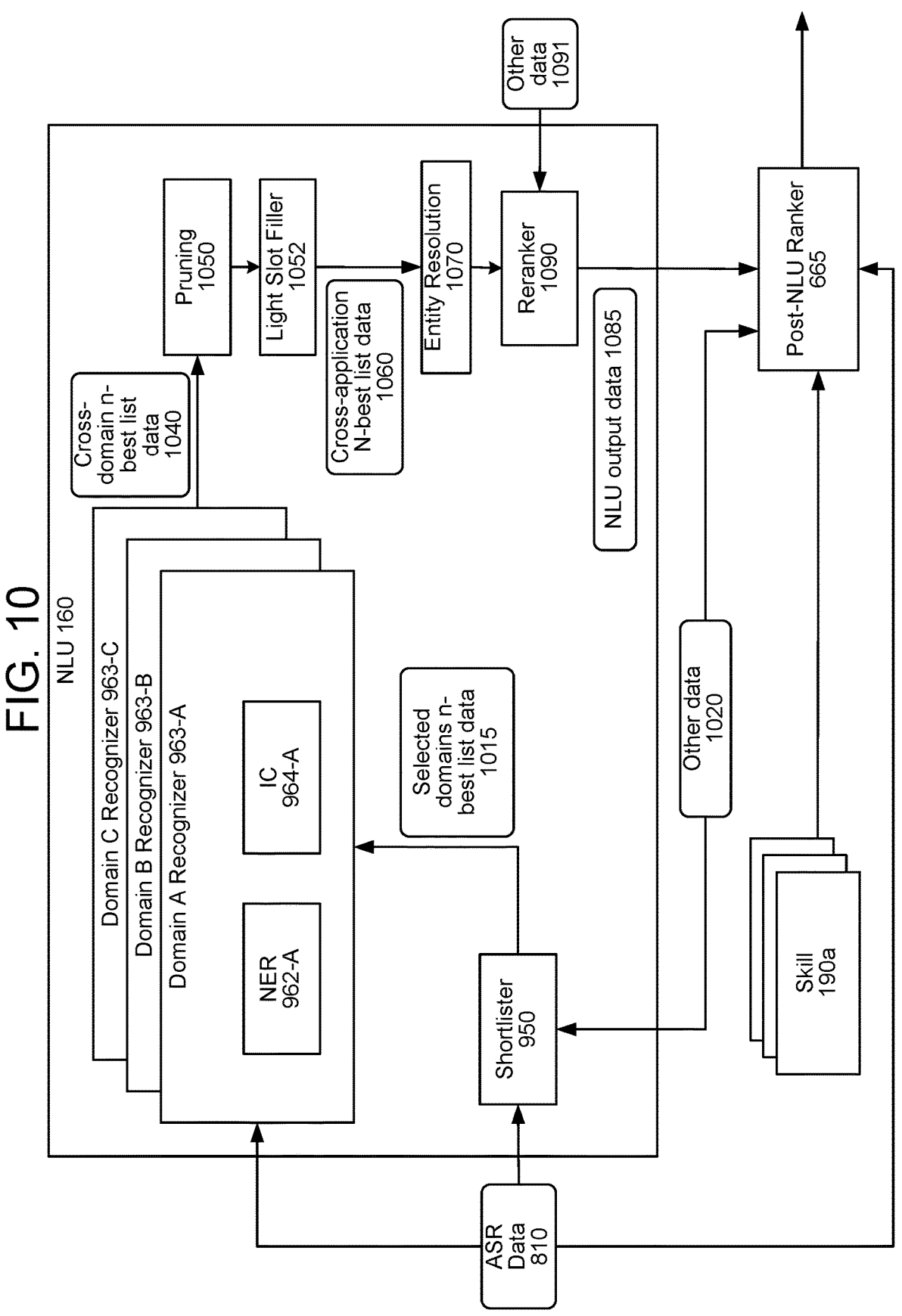
FIG. 10 is a conceptual diagram of how natural language processing is performed, according to embodiments of the present disclosure.

FIGS. 9 and 10 illustrates how the NLU component 160 may perform NLU processing. FIG. 9 is a conceptual diagram of how natural language processing is performed, according to embodiments of the present disclosure. And FIG. 10 is a conceptual diagram of how natural language processing is performed, according to embodiments of the present disclosure.

FIG. 9 illustrates how NLU processing is performed on text data. The NLU component 160 may process text data including several ASR hypotheses of a single user input. For example, if the ASR component 150 outputs text data including an n-best list of ASR hypotheses, the NLU component 160 may process the text data with respect to all (or a portion of) the ASR hypotheses represented therein.

The NLU component 160 may annotate text data by parsing and/or tagging the text data. For example, for the text data "tell me the weather for Seattle," the NLU component 160 may tag "tell me the weather for Seattle" as an <OutputWeather> intent as well as separately tag "Seattle" as a location for the weather information.

The NLU component 160 may include a shortlister component 950. The shortlister component 950 selects skills that may execute with respect to ASR output data 810 input to the NLU component 160 (e.g., applications that may execute with respect to the user input). The ASR output data 810 (which may also be referred to as ASR data 810) may include representations of text of an utterance, such as words, subword units, or the like. The shortlister component 950 thus limits downstream, more resource intensive NLU processes to being performed with respect to skills that may execute with respect to the user input.

Without a shortlister component 950, the NLU component 160 may process ASR output data 810 input thereto with respect to every skill of the system, either in parallel, in series, or using some combination thereof. By implementing a shortlister component 950, the NLU component 160 may process ASR output data 810 with respect to only the skills that may execute with respect to the user input. This reduces total compute power and latency attributed to NLU processing.

The shortlister component 950 may include one or more trained models. The model(s) may be trained to recognize various forms of user inputs that may be received by the system component(s) 120. For example, during a training period skill system(s) 125 associated with a skill may provide the system component(s) 120 with training text data representing sample user inputs that may be provided by a user to invoke the skill. For example, for a ride sharing skill, a skill system(s) 125 associated with the ride sharing skill may provide the system component(s) 120 with training text data including text corresponding to "get me a cab to [location]," "get me a ride to [location]," "book me a cab to [location]," "book me a ride to [location]," etc. The one or more trained models that will be used by the shortlister component 950 may be trained, using the training text data representing sample user inputs, to determine other potentially related user input structures that users may try to use to invoke the particular skill. During training, the system component(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system component(s) 120 with training text data indicating grammar and annotations. The system component(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 950 may be trained with respect to a different skill. Alternatively, the shortlister component 950 may use one trained model per domain, such as one trained model for skills associated with a weather domain, one trained model for skills associated with a ride sharing domain, etc.

The system component(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 950. For example, some sample user inputs may be positive examples (e.g., user inputs that may be used to invoke the skill). Other sample user inputs may be negative examples (e.g., user inputs that may not be used to invoke the skill).

As described above, the shortlister component 950 may include a different trained model for each skill of the system, a different trained model for each domain, or some other combination of trained model(s). For example, the shortlister component 950 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 950 to output indications of only a portion of the skills that the ASR output data 810 may relate to. For example, a user input may correspond to "tell me about Tom Collins." If the model is clustered based on domain, the shortlister component 950 may determine the user input corresponds to a recipe skill (e.g., a drink recipe) even though the user input may also correspond to an information skill (e.g., including information about a person named Tom Collins).

The NLU component 160 may include one or more recognizers 963. In at least some embodiments, a recognizer 963 may be associated with a skill system 125 (e.g., the recognizer may be configured to interpret text data to correspond to the skill system 125). In at least some other examples, a recognizer 963 may be associated with a domain such as smart home, video, music, weather, custom, etc. (e.g., the recognizer may be configured to interpret text data to correspond to the domain).

If the shortlister component 950 determines ASR output data 810 is potentially associated with multiple domains, the recognizers 963 associated with the domains may process the ASR output data 810, while recognizers 963 not indicated in the shortlister component 950's output may not process the ASR output data 810. The "shortlisted" recognizers 963 may process the ASR output data 810 in parallel, in series, partially in parallel, etc. For example, if ASR output data 810 potentially relates to both a communications domain and a music domain, a recognizer associated with the communications domain may process the ASR output data 810 in parallel, or partially in parallel, with a recognizer associated with the music domain processing the ASR output data 810.

Each recognizer 963 may include a named entity recognition (NER) component 962. The NER component 962 attempts to identify grammars and lexical information that may be used to construe meaning with respect to text data input therein. The NER component 962 identifies portions of text data that correspond to a named entity associated with a domain, associated with the recognizer 963 implementing the NER component 962. The NER component 962 (or other component of the NLU component 160) may also determine whether a word refers to an entity whose identity is not explicitly mentioned in the text data, for example "him," "her," "it" or other anaphora, exophora, or the like.

Each recognizer 963, and more specifically each NER component 962, may be associated with a particular grammar database 976, a particular set of intents/actions 974, and a particular personalized lexicon 986. The grammar databases 976, and intents/actions 974 may be stored in an NLU storage 973. Each gazetteer 984 may include domain/skill-indexed lexical information associated with a particular user and/or device 110. For example, a Gazetteer A (984a) includes skill-indexed lexical information 986aa to 986an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 962 applies grammar information 976 and lexical information 986 associated with a domain (associated with the recognizer 963 implementing the NER component 962) to determine a mention of one or more entities in text data. In this manner, the NER component 962 identifies "slots" (each corresponding to one or more particular words in text data) that may be useful for later processing. The NER component 962 may also label each slot with a type (e.g., noun, place, city, artist name, song name, etc.).

Each grammar database 976 includes the names of entities (i.e., nouns) commonly found in speech about the particular domain to which the grammar database 976 relates, whereas the lexical information 986 is personalized to the user and/or the device 110 from which the user input originated. For example, a grammar database 976 associated with a shopping domain may include a database of words commonly used when people discuss shopping.

A downstream process called entity resolution (discussed in detail elsewhere herein) links a slot of text data to a specific entity known to the system. To perform entity resolution, the NLU component 160 may utilize gazetteer information (984a-984n) stored in an entity library storage 982. The gazetteer information 984 may be used to match text data (representing a portion of the user input) with text data representing known entities, such as song titles, contact names, etc. Gazetteers 984 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 963 may also include an intent classification (IC) component 964. An IC component 964 parses text data to determine an intent(s) (associated with the domain associated with the recognizer 963 implementing the IC component 964) that potentially represents the user input. An intent represents to an action a user desires be performed. An IC component 964 may communicate with a database 973 of words linked to intents. For example, a music intent database may link words and phrases such as "quiet," "volume off," and "mute" to a <Mute> intent. An IC component 964 identifies potential intents by comparing words and phrases in text data (representing at least a portion of the user input) to the words and phrases in an intents database 973 (associated with the domain that is associated with the recognizer 963 implementing the IC component 964).

The intents identifiable by a specific IC component 964 are linked to domain-specific (i.e., the domain associated with the recognizer 963 implementing the IC component 964) grammar frameworks 976 with "slots" to be filled. Each slot of a grammar framework 976 corresponds to a portion of text data that the system believes corresponds to an entity. For example, a grammar framework 976 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 976 may not be structured as sentences, but rather based on associating slots with grammatical tags.

For example, an NER component 962 may parse text data to identify words as subject, object, verb, preposition, etc. based on grammar rules and/or models prior to recognizing named entities in the text data. An IC component 964 (implemented by the same recognizer 963 as the NER component 962) may use the identified verb to identify an intent. The NER component 962 may then determine a grammar model 976 associated with the identified intent. For example, a grammar model 976 for an intent corresponding to <PlayMusic> may specify a list of slots applicable to play the identified "object" and any object modifier (e.g., a prepositional phrase), such as {Artist Name}, {Album Name}, {Song name}, etc. The NER component 962 may then search corresponding fields in a lexicon 986 (associated with the domain associated with the recognizer 963 implementing the NER component 962), attempting to match words and phrases in text data the NER component 962 previously tagged as a grammatical object or object modifier with those identified in the lexicon 986.

An NER component 962 may perform semantic tagging, which is the labeling of a word or combination of words according to their type/semantic meaning. An NER component 962 may parse text data using heuristic grammar rules, or a model may be constructed using techniques such as Hidden Markov Models, maximum entropy models, log linear models, conditional random fields (CRF), and the like. For example, an NER component 962 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 962 identifies "Play" as a verb based on a word database associated with the music domain, which an IC component 964 (also implemented by the music domain recognizer) may determine corresponds to a <PlayMusic> intent. At this stage, no determination has been made as to the meaning of "mother's little helper" or "the rolling stones," but based on grammar rules and models, the NER component 962 has determined the text of these phrases relates to the grammatical object (i.e., entity) of the user input represented in the text data.

An NER component 962 may tag text data to attribute meaning thereto. For example, an NER component 962 may tag "play mother's little helper by the rolling stones" as: {domain} Music, {intent} <PlayMusic>, {artist name} rolling stones, {media type} SONG, and {song title} mother's little helper. For further example, the NER component 962 may tag "play songs by the rolling stones" as: {domain} Music, {intent}<PlayMusic>, {artist name} rolling stones, and {media type} SONG.

The shortlister component 950 may receive ASR output data 810 output from the ASR component 150 or output from the device 110*b* (as illustrated in FIG. 10). The ASR component 150 may embed the ASR output data 810 into a form processable by a trained model(s) using sentence embedding techniques as known in the art. Sentence embedding results in the ASR output data 810 including text in a structure that enables the trained models of the shortlister component 950 to operate on the ASR output data 810. For example, an embedding of the ASR output data 810 may be a vector representation of the ASR output data 810.

The shortlister component 950 may make binary determinations (e.g., yes or no) regarding which domains relate to the ASR output data 810. The shortlister component 950 may make such determinations using the one or more trained models described herein above. If the shortlister component 950 implements a single trained model for each domain, the shortlister component 950 may simply run the models that are associated with enabled domains as indicated in a user profile associated with the device 110 and/or user that originated the user input.

The shortlister component 950 may generate n-best list data 1015 representing domains that may execute with respect to the user input represented in the ASR output data 810. The size of the n-best list represented in the n-best list data 1015 is configurable. In an example, the n-best list data 1015 may indicate every domain of the system as well as contain an indication, for each domain, regarding whether the domain is likely capable to execute the user input represented in the ASR output data 810. In another example, instead of indicating every domain of the system, the n-best list data 1015 may only indicate the domains that are likely to be able to execute the user input represented in the ASR output data 810. In yet another example, the shortlister component 950 may implement thresholding such that the n-best list data 1015 may indicate no more than a maximum number of domains that may execute the user input represented in the ASR output data 810. In an example, the threshold number of domains that may be represented in the n-best list data 1015 is ten. In another example, the domains included in the n-best list data 1015 may be limited by a threshold a score, where only domains indicating a likelihood to handle the user input is above a certain score (as determined by processing the ASR output data 810 by the shortlister component 950 relative to such domains) are included in the n-best list data 1015.

The ASR output data 810 may correspond to more than one ASR hypothesis. When this occurs, the shortlister component 950 may output a different n-best list (represented in the n-best list data 1015) for each ASR hypothesis. Alternatively, the shortlister component 950 may output a single n-best list representing the domains that are related to the multiple ASR hypotheses represented in the ASR output data 810.

As indicated above, the shortlister component 950 may implement thresholding such that an n-best list output therefrom may include no more than a threshold number of entries. If the ASR output data 810 includes more than one ASR hypothesis, the n-best list output by the shortlister component 950 may include no more than a threshold number of entries irrespective of the number of ASR hypotheses output by the ASR component 150. Alternatively or in addition, the n-best list output by the shortlister component 950 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 810, the shortlister component 950 may generate confidence scores representing likelihoods that domains relate to the ASR output data 810. If the shortlister component 950 implements a different trained model for each domain, the shortlister component 950 may generate a different confidence score for each individual domain trained model that is run. If the shortlister component 950 runs the models of every domain when ASR output data 810 is received, the shortlister component 950 may generate a different confidence score for each domain of the system. If the shortlister component 950 runs the models of only the domains that are associated with skills indicated as enabled in a user profile associated with the device 110 and/or user that originated the user input, the shortlister component 950 may only generate a different confidence score for each domain associated with at least one enabled skill. If the shortlister component 950 implements a single trained model with domain specifically trained portions, the shortlister component 950 may generate a different confidence score for each domain who's specifically trained portion is run. The shortlister component 950 may perform matrix vector modification to obtain confidence scores for all domains of the system in a single instance of processing of the ASR output data 810.

N-best list data 1015 including confidence scores that may be output by the shortlister component 950 may be represented as, for example:

Search domain, 0.67
    Recipe domain, 0.62
    Information domain, 0.57
    Shopping domain, 0.42

As indicated, the confidence scores output by the shortlister component 950 may be numeric values. The confidence scores output by the shortlister component 950 may alternatively be binned values (e.g., high, medium, low).

The n-best list may only include entries for domains having a confidence score satisfying (e.g., equaling or exceeding) a minimum threshold confidence score. Alternatively, the shortlister component 950 may include entries for all domains associated with user enabled skills, even if one or more of the domains are associated with confidence scores that do not satisfy the minimum threshold confidence score.

The shortlister component 950 may consider other data 1020 when determining which domains may relate to the user input represented in the ASR output data 810 as well as respective confidence scores. The other data 1020 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 1020 may include an indicator of the user associated with the ASR output data 810, for example as determined by the user recognition component 695.

The other data 1020 may be character embedded prior to being input to the shortlister component 950. The other data 1020 may alternatively be embedded using other techniques known in the art prior to being input to the shortlister component 950.

The other data 1020 may also include data indicating the domains associated with skills that are enabled with respect to the device 110 and/or user that originated the user input. The shortlister component 950 may use such data to determine which domain-specific trained models to run. That is, the shortlister component 950 may determine to only run the trained models associated with domains that are associated with user-enabled skills. The shortlister component 950 may alternatively use such data to alter confidence scores of domains.

As an example, considering two domains, a first domain associated with at least one enabled skill and a second domain not associated with any user-enabled skills of the user that originated the user input, the shortlister component 950 may run a first model specific to the first domain as well as a second model specific to the second domain. Alternatively, the shortlister component 950 may run a model configured to determine a score for each of the first and second domains. The shortlister component 950 may determine a same confidence score for each of the first and second domains in the first instance. The shortlister component 950 may then alter those confidence scores based on which domains is associated with at least one skill enabled by the present user. For example, the shortlister component 950 may increase the confidence score associated with the domain associated with at least one enabled skill while leaving the confidence score associated with the other domain the same. Alternatively, the shortlister component 950 may leave the confidence score associated with the domain associated with at least one enabled skill the same while decreasing the confidence score associated with the other domain. Moreover, the shortlister component 950 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 170. When the shortlister component 950 receives the ASR output data 810, the shortlister component 950 may determine whether profile data associated with the user and/or device 110 that originated the command includes an indication of enabled skills.

The other data 1020 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 950 may use such data to determine which domain-specific trained models to run. For example, if the device 110 corresponds to a displayless type device, the shortlister component 950 may determine not to run trained models specific to domains that output video data. The shortlister component 950 may alternatively use such data to alter confidence scores of domains.

As an example, considering two domains, one that outputs audio data and another that outputs video data, the shortlister component 950 may run a first model specific to the domain that generates audio data as well as a second model specific to the domain that generates video data. Alternatively the shortlister component 950 may run a model configured to determine a score for each domain. The shortlister component 950 may determine a same confidence score for each of the domains in the first instance. The shortlister component 950 may then alter the original confidence scores based on the type of the device 110 that originated the user input corresponding to the ASR output data 810. For example, if the device 110 is a displayless device, the shortlister component 950 may increase the confidence score associated with the domain that generates audio data while leaving the confidence score associated with the domain that generates video data the same. Alternatively, if the device 110 is a displayless device, the shortlister component 950 may leave the confidence score associated with the domain that generates audio data the same while decreasing the confidence score associated with the domain that generates video data. Moreover, if the device 110 is a displayless device, the shortlister component 950 may increase the confidence score associated with the domain that generates audio data as well as decrease the confidence score associated with the domain that generates video data.

The type of device information represented in the other data 1020 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1020 may represent the smart TV of other display device, and not the displayless device that captured the spoken user input.

The other data 1020 may also include data indicating the user input originating device's speed, location, or other mobility information. For example, the device may correspond to a vehicle including a display. If the vehicle is moving, the shortlister component 950 may decrease the confidence score associated with a domain that generates video data as it may be undesirable to output video content to a user while the user is driving. The device may output data to the system component(s) 120 indicating when the device is moving.

The other data 1020 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 950 may use such data to alter confidence scores of domains. For example, the shortlister component 950 may run a first model specific to a first domain as well as a second model specific to a second domain. Alternatively, the shortlister component 950 may run a model configured to determine a score for each domain. The shortlister component 950 may also determine a same confidence score for each of the domains in the first instance. The shortlister component 950 may then alter the original confidence scores based on the first domain being invoked to cause the system to output content while the current user input was received. Based on the first domain being invoked, the shortlister component 950 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1015 generated by the shortlister component 950 as well as the different types of other data 1020 considered by the shortlister component 950 are configurable. For example, the shortlister component 950 may update confidence scores as more other data 1020 is considered. For further example, the n-best list data 1015 may exclude relevant domains if thresholding is implemented. Thus, for example, the shortlister component 950 may include an indication of a domain in the n-best list 1015 unless the shortlister component 950 is one hundred percent confident that the domain may not execute the user input represented in the ASR output data 810 (e.g., the shortlister component 950 determines a confidence score of zero for the domain).

The shortlister component 950 may send the ASR output data 810 to recognizers 963 associated with domains represented in the n-best list data 1015. Alternatively, the shortlister component 950 may send the n-best list data 1015 or some other indicator of the selected subset of domains to another component (such as the orchestrator component

130) which may in turn send the ASR output data 810 to the recognizers 963 corresponding to the domains included in the n-best list data 1015 or otherwise indicated in the indicator. If the shortlister component 950 generates an n-best list representing domains without any associated confidence scores, the shortlister component 950/orchestrator component 130 may send the ASR output data 810 to recognizers 963 associated with domains that the shortlister component 950 determines may execute the user input. If the shortlister component 950 generates an n-best list representing domains with associated confidence scores, the shortlister component 950/orchestrator component 130 may send the ASR output data 810 to recognizers 963 associated with domains associated with confidence scores satisfying (e.g., meeting or exceeding) a threshold minimum confidence score.

A recognizer 963 may output tagged text data generated by an NER component 962 and an IC component 964, as described herein above. The NLU component 160 may compile the output tagged text data of the recognizers 963 into a single cross-domain n-best list 1040 and may send the cross-domain n-best list 1040 to a pruning component 1050. Each entry of tagged text (e.g., each NLU hypothesis) represented in the cross-domain n-best list data 1040 may be associated with a respective score indicating a likelihood that the NLU hypothesis corresponds to the domain associated with the recognizer 963 from which the NLU hypothesis was output. For example, the cross-domain n-best list data 1040 may be represented as (with each line corresponding to a different NLU hypothesis):

> [0.95] Intent: <PlayMusic> ArtistName: Beethoven Song-Name: Waldstein Sonata
>
> [0.70] Intent: <PlayVideo> ArtistName: Beethoven VideoName: Waldstein Sonata
>
> [0.01] Intent: <PlayMusic> ArtistName: Beethoven AlbumName: Waldstein Sonata
>
> [0.01] Intent: <PlayMusic> SongName: Waldstein Sonata The pruning component 1050 may sort the NLU hypotheses represented in the cross-domain n-best list data 1040 according to their respective scores. The pruning component 1050 may perform score thresholding with respect to the cross-domain NLU hypotheses. For example, the pruning component 1050 may select NLU hypotheses associated with scores satisfying (e.g., meeting and/or exceeding) a threshold score. The pruning component 1050 may also or alternatively perform number of NLU hypothesis thresholding. For example, the pruning component 1050 may select the top scoring NLU hypothesis(es). The pruning component 1050 may output a portion of the NLU hypotheses input thereto. The purpose of the pruning component 1050 is to create a reduced list of NLU hypotheses so that downstream, more resource intensive, processes may only operate on the NLU hypotheses that most likely represent the user's intent.

The NLU component 160 may include a light slot filler component 1052. The light slot filler component 1052 can take text from slots represented in the NLU hypotheses output by the pruning component 1050 and alter them to make the text more easily processed by downstream components. The light slot filler component 1052 may perform low latency operations that do not involve heavy operations such as reference to a knowledge base (e.g., 972. The purpose of the light slot filler component 1052 is to replace words with other words or values that may be more easily understood by downstream components. For example, if a NLU hypothesis includes the word "tomorrow," the light slot filler component 1052 may replace the word "tomorrow" with an actual date for purposes of downstream processing. Similarly, the light slot filler component 1052 may replace the word "CD" with "album" or the words "compact disc." The replaced words are then included in the cross-domain n-best list data 1060.

The cross-domain n-best list data 1060 may be input to an entity resolution component 1070. The entity resolution component 1070 can apply rules or other instructions to standardize labels or tokens from previous stages into an intent/slot representation. The precise transformation may depend on the domain. For example, for a travel domain, the entity resolution component 1070 may transform text corresponding to "Boston airport" to the standard BOS three-letter code referring to the airport. The entity resolution component 1070 can refer to a knowledge base (e.g., 972) that is used to specifically identify the precise entity referred to in each slot of each NLU hypothesis represented in the cross-domain n-best list data 1060. Specific intent/slot combinations may also be tied to a particular source, which may then be used to resolve the text. In the example "play songs by the stones," the entity resolution component 1070 may reference a personal music catalog, Amazon Music account, a user profile, or the like. The entity resolution component 1070 may output an altered n-best list that is based on the cross-domain n-best list 1060 but that includes more detailed information (e.g., entity IDs) about the specific entities mentioned in the slots and/or more detailed slot data that can eventually be used by a skill. The NLU component 160 may include multiple entity resolution components 1070 and each entity resolution component 1070 may be specific to one or more domains.

The NLU component 160 may include a reranker 1090. The reranker 1090 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1070.

The reranker 1090 may apply re-scoring, biasing, or other techniques. The reranker 1090 may consider not only the data output by the entity resolution component 1070, but may also consider other data 1091. The other data 1091 may include a variety of information. For example, the other data 1091 may include skill rating or popularity data. For example, if one skill has a high rating, the reranker 1090 may increase the score of a NLU hypothesis that may be processed by the skill. The other data 1091 may also include information about skills that have been enabled by the user that originated the user input. For example, the reranker 1090 may assign higher scores to NLU hypothesis that may be processed by enabled skills than NLU hypothesis that may be processed by non-enabled skills. The other data 1091 may also include data indicating user usage history, such as if the user that originated the user input regularly uses a particular skill or does so at particular times of day. The other data 1091 may additionally include data indicating date, time, location, weather, type of device 110, user identifier, context, as well as other information. For example, the reranker 1090 may consider when any particular skill is currently active (e.g., music being played, a game being played, etc.).

As illustrated and described, the entity resolution component 1070 is implemented prior to the reranker 1090. The entity resolution component 1070 may alternatively be implemented after the reranker 1090. Implementing the entity resolution component 1070 after the reranker 1090 limits the NLU hypotheses processed by the entity resolution component 1070 to only those hypotheses that successfully pass through the reranker 1090.

The reranker 1090 may be a global reranker (e.g., one that is not specific to any particular domain). Alternatively, the NLU component 160 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 160 may perform NLU processing described above with respect to domains associated with skills wholly implemented as part of the system component(s) 120 (e.g., designated 190 in FIG. 6). The NLU component 160 may separately perform NLU processing described above with respect to domains associated with skills that are at least partially implemented as part of the skill system(s) 125. In an example, the shortlister component 950 may only process with respect to these latter domains.

FIG. 11 illustrate operations to handle dialog management, according to embodiments of the present disclosure. One or more components shown in FIG. 11 may be part of the dialog manager 172. For example, the dialog manager 172 may include the entity resolver 1170, the focus data component 1116 and the action selector 1118. The dialog manager 172 may work in concert with other language processing components, for example NLU 160, or may operate instead of such components in certain embodiments.

The system receives input text data 1102 which may be received, for example, by a device (e.g., 613) or from another component of the system (for example as ASR output data 810). The input text data 1102 may include text corresponding to a user input and metadata indicating further information about the text (such as an identity of the user for example determined by user recognition component 695), an emotional state of the user. The input text data 1102 may be text representing words, instructions, markup language, speech, or gestures, or may be a vector or other representation of the same. The input text data 1102 may be generated by a user via a keyboard, touchscreen, microphone, camera, or other such input device. In other embodiments, the input text data 1102 is created using ASR, as described above, from audio data received from a user. The system may further receive other input data 1104, which may correspond to a button press, gesture, or other input, such as image data as may interpreted by device 110, system component(s) 120, or other component. As described in greater detail below, using the input text data 1102 and/or other input data 1104, the system may determine and output text data 315 and/or other output data 1108. The system may instead or in addition perform an action based on the input text data 1102 and/or other input data 1104, such as calling one or more APIs 1110.

An entity resolver 1170 may be used to determine that the input text data 1102 includes a representation of one or more entities, a process that may include named entity recognition (NER)—i.e., determining that the input text data 1102 includes the representation—and entity resolution (ER)—i.e., identifying a meaning or context of the entity, such as associating an identity of a person based on a recognized nickname. An entity may be a person, place, thing, idea, and/or goal; example entities include proper names, nicknames, business names, place names, and/or application names. The entity resolver 1170 may operate similarly to NER component 962 and/or entity resolution component 1070 discussed herein with regard to NLU operations.

In some embodiments, a single entity resolver 1170 is used for more than one domain (i.e., a "cross-domain" entity resolver 1170). Each domain may correspond to one or more dialog models. One or more candidate domains corresponding to the input text data 1170 may be determined; entity resolvers 1170 corresponding to the candidate domains may be used to process the input text data 1170. The dialog focus data 1116 may store the output entities from each candidate domain and may remove unselected entities when an API 1110 is selected or an action to be performed is determined.

The dialog focus data 1116 may store state data (for example in dialog storage 1130) corresponding to dialog history data (including an intent(s), an entity(ies), etc. corresponding to a prior turn in the dialog), action history data, and/or other data. In some embodiments, the other components (e.g., the action selector 1118) do not store state data and instead query the dialog focus data 1116 for the state data. The system may send some or all of the dialog focus data 1116 to other systems and/or may receive additional dialog focus data from other systems. In some embodiments, the other components (e.g., the action selector 1118) include a feature-extractor component to extract features from the dialog focus data 1116.

The dialog focus data 1116 may be graph-based data including a plurality of graph nodes; each graph node may correspond to an item of state data, such as an entity type, entity value, prior API call, and/or user data. The other components, such as the action selector 1118, may access all of the graph nodes of the dialog focus data 1116 or may access only a subset of the graph nodes of the dialog focus data 1116. The dialog focus data 1116 may be any type of storage mechanism and may serve as long-term and/or short term memory for the system, thus enabling tracking of entities, ASR output, TTS output, and other features) at each turn through a dialog. In some embodiments, the dialog focus data 1116 is updated after each turn of dialog with updated dialog focus data; in other embodiments, the dialog focus data 1116 is updated after an end of a dialog is determined.

The entity resolver 1170 may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain skills 190 (e.g., a shopping skill, a music skill, a video skill, etc.), or may be organized in a variety of other ways.

The entity resolver 1170 may include a ranker component. The ranker component may assign a particular confidence score to each hypothesis input therein. The confidence score of a hypothesis may represent a confidence of the system in the processing performed with respect to the hypothesis. The confidence score of a particular hypothesis may be affected by whether the hypothesis has unfilled slots. For example, if a hypothesis associated with a first skill component includes slots that are all filled/resolved, that NLU hypothesis may be assigned a higher confidence score than another hypothesis including at least some slots that are unfilled/unresolved by the entity resolver 1170.

The focus data 1116 may store data relevant to a dialog. In various embodiments, the dialog focus data 1116 stores the input text data 1102, other input data 1104, entity data from the entity resolver 1170 and/or action data and dialog data from an action selector 1118. The dialog focus data 1116 may further include additional information, such as location data, user preference data, and environment data. In various embodiments, the dialog focus data 1116 uses an encoder to encode some or all of the received data into one or more feature vectors and a decoder to determine, based on the feature vectors, intent data corresponding to an intent of a user. The dialog focus data 1116 may further include state data that represents prior dialog, actions, or other prior user information or data.

The action selector 1118 determines an action to be performed in response to the user request, where the action may include calling an API to perform an action and/or presenting an output to the user. The action selector 1118 may include a trained model(s), and may process the dialog focus data 1116. If the action selector 1118 determines to invoke an API call, one or more APIs 1110 may be activated and a corresponding action carried out. If the action selector 1118 determines to present a prompt or other output data to the user, the NLG component 679 may be used to generate the output text data 315 and/or other output data 1108. In either case, the action selection 1118 may update the dialog focus data 1116 based on the API call or the output presented to the user.

In some embodiments, the action selector 1118 may process data from the dialog storage 1130 to select one or more skills 190/skill system(s) 125 capable of responding to the user request, and present the selected skill to the user using the output text data 315.

In some embodiments, the system component(s) 120 may determine past interaction data, such as a satisfaction rating corresponding to skill(s) 190 and store it in the storage 1130. The satisfaction rating may be based on past interactions between users of the system component(s) 120 and the skill. In some embodiments, the system component(s) 120 may determine a user-specific satisfaction rating corresponding to the skill based on user-specific data, interaction-specific data and/or focus data 1116, such as, user profile data 170 associated with the specific user, location data, past user interactions with the system component(s) 120, past user interactions with the skill 190, user preferences, device type for the device 110 that received the user request, device type for the device 110 that may output/respond to the user request, device capabilities, dialog state of previous turns in the dialog, and other data.

In some embodiments, users may provide feedback to the system component(s) 120 or the skill system(s) 125 indicating the user's satisfaction in the service skill responding to the user request/performing an action in response to the user request. The feedback may be solicited by the system component(s) 120 or the skill system(s) 125. In some cases, the feedback may be explicit feedback and may be received as a voice input, text input, gestures, or other types of input. In other cases, the feedback may be implicit feedback and may be determined by processing data related to the user interaction, such as, image data representing the user's facial expression, audio data (representing an utterance from the user) indicating a sentiment/emotion of the user, text data (representing the user input) indicating a sentiment of the user, other sounds/speech indicating the user's emotions/feelings/sentiment (e.g., "ugh" indicating frustration), and other types of data.

The action selector 1118 may select a skill based on various other factors, including but not limited to, a user's age, user cohort (user affinities or other social organizations), location information (e.g., where the user input originated, where the user intends to travel to, etc.), skill location data, intent, intent type, time of day the user input is received, time of year the user input is received, and others.

The action selector 1118 may select a skill based on skill availability, for example, a reservations at a restaurant may indicate availability or no availability for a particular day. The system component(s) 120/action selector 1118 may determine the number of diners at a restaurant or the number of takeout orders a restaurant is handling based on the number of user requests the system component(s) 120 routed to the skill. In another example, the system component(s) 120/action selector 1118 may determine that a number of user requests were routed to a first skill for a first location/ geographic area (e.g., a city), and may determine to route the next/future user requests to another skill for that geographic area.

For a restaurant reservation, the action selector 1118 may select a skill based on a number of people in the user's party, since some restaurants may not make reservations for small parties less than a particular number. The action selector 1118 may select a skill based on person(s) other than the user that may be involved in the user request. For example, if the user says "Alexa, what should we do tomorrow?" the system component(s) 120 may determine information relating to the other persons in the user's household to select a skill.

The action selector 1118 may select a skill based on the dialog state where the dialog state indicates multiple turns/ attempts to recommend a skill/service provider, and the action selector 1118 may modify the search criteria (e.g., expand the zip code, expand the time frame, etc.) to select a skill.

In some examples, a neural network may include a number of layers, from input layer 1 through output layer N. Each layer is configured to output a particular type of data and output another type of data. Thus, a neural network may be configured to input data of type data A (which is the input to layer 1) and output data of type data Z (which is the output from the last layer N). The output from one layer is then taken as the input to the next layer. For example, the output data (data B) from layer 1 is the input data for layer 2 and so forth such that the input to layer N is data Y output from a penultimate layer.

While values for the input data/output data of a particular layer are not known until a neural network is actually operating during runtime, the data describing the neural network describes the structure and operations of the layers of the neural network.

In some examples, a neural network may be structured with an input layer, middle layer(s), and an output layer. The middle layer(s) may also be known as the hidden layer(s). Each node of the hidden layer is connected to each node in the input layer and each node in the output layer. In some examples, a neural network may include a single hidden layer, although the disclosure is not limited thereto and the neural network may include multiple middle layers without departing from the disclosure. In this case, each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

In one aspect, the neural network may be constructed with recurrent connections such that the output of the hidden layer of the network feeds back into the hidden layer again for the next set of inputs. For example, each node of the input layer may connect to each node of the hidden layer, and each node of the hidden layer may connect to each node of the output layer. In addition, the output of the hidden layer may be fed back into the hidden layer for processing of the next set of inputs. A neural network incorporating recurrent connections may be referred to as a recurrent neural network (RNN).

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 12:
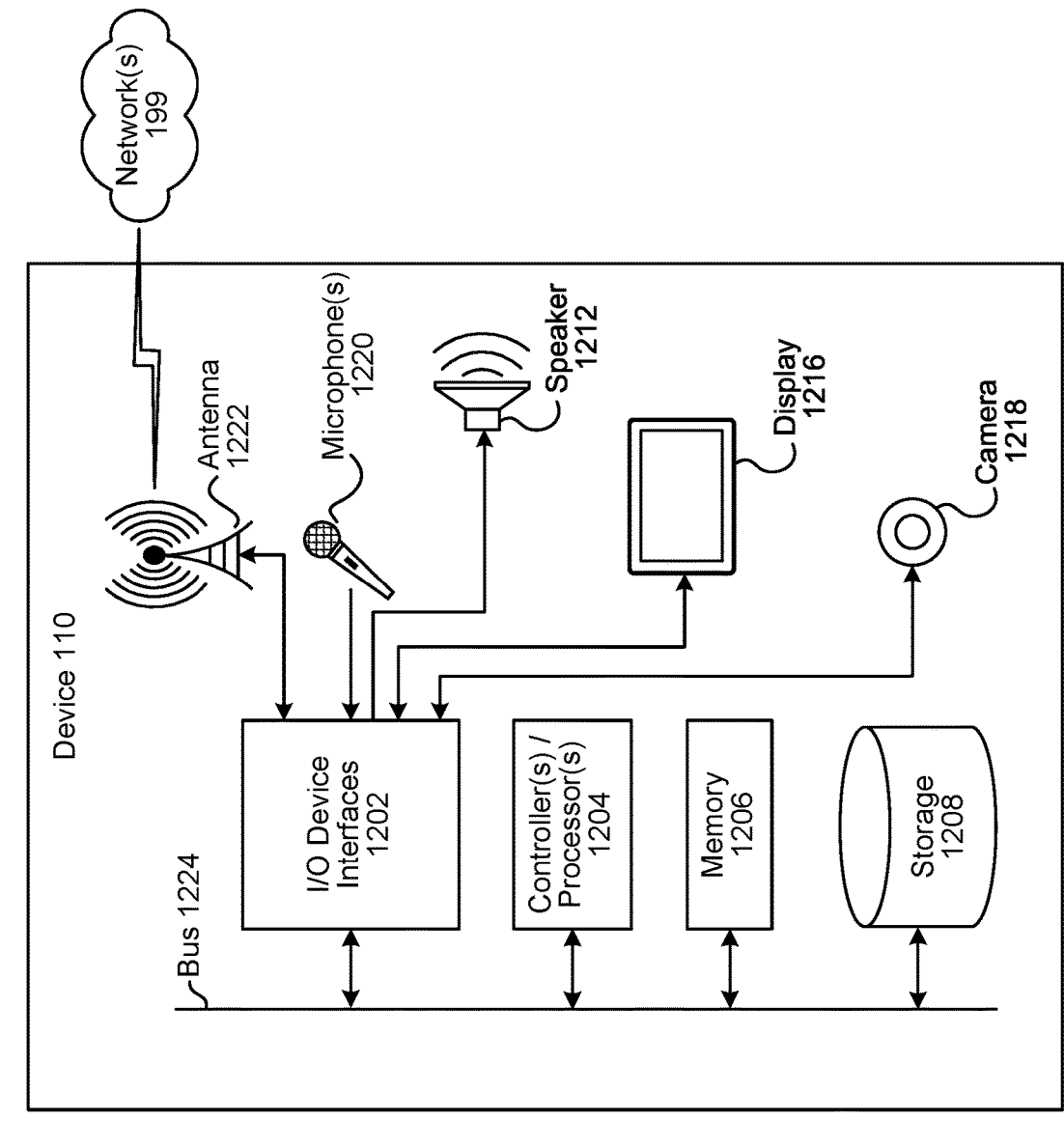
FIG. 12 is a block diagram conceptually illustrating example components of a device, according to embodiments of the present disclosure.
Figure 13:
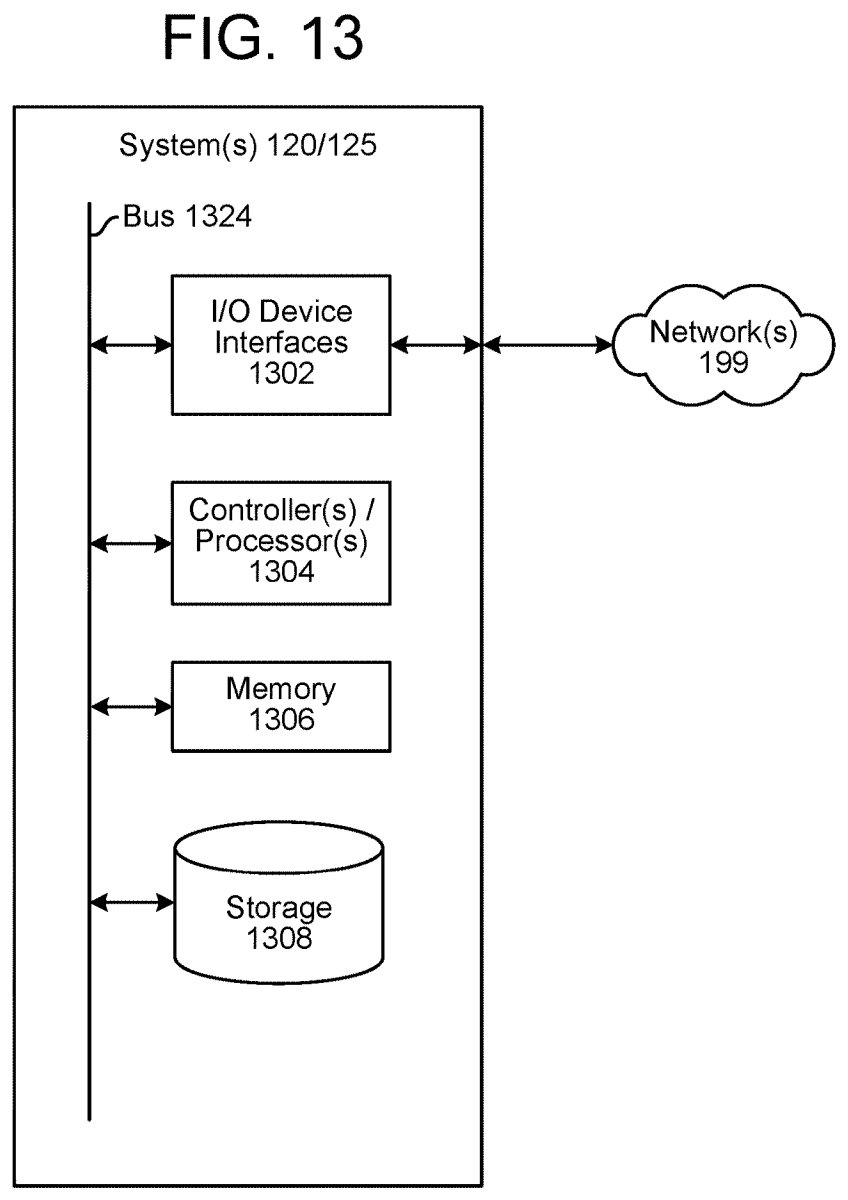

FIG. 12 is a block diagram conceptually illustrating a device 110 that may be used with the system. FIG. 13 is a block diagram conceptually illustrating example components of a remote device, such as the natural language command processing system component(s) 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) 120 may be located remotely from the device 110 as its operations may not require proximity to the user. The server/system component(s) 120 may be located in an entirely different location from the device 110 (for example, as part of a cloud computing system or the like) or may be located in a same environment as the device 110 but physically separated therefrom (for example a home server or a similar device that resides in a user's home or business but perhaps in a closet, basement, attic, or the like). The supporting device 120 may also be a version of a user device 110 that includes different (e.g., more) processing capabilities than other user device(s) 110 in a home/office. One benefit to the server/system component(s) 120 being in a user's home/business is that data used to process a command/return a response may be kept within the user's home, thus reducing potential privacy concerns.

Multiple systems (120/125) may be included in the overall system 100 of the present disclosure, such as one or more natural language processing system components 120 for performing ASR processing, one or more natural language processing system components 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/125) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1202/1302).

Computer instructions for operating each device (110/120/125) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/125) includes input/output device interfaces (1202/1302). A variety of components may be connected through the input/output device interfaces (1202/1302), as will be discussed further below. Additionally, each device (110/120/125) may include an address/data bus (1224/1324) for conveying data among components of the respective device. Each component within a device (110/120/125) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1222, the input/output device interfaces 1202 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device(s) 110, the natural language command processing system component(s) 120, or a skill system 125 may include their own dedicated processors, memory, and/or storage. Alternatively, one or more of the components of the device(s) 110, the natural language command processing system component(s) 120, or a skill system 125 may utilize the I/O interfaces (1202/1302), processor(s) (1204/1304), memory (1206/1306), and/or storage (1208/1308) of the device(s) 110, natural language command processing system component(s) 120, or the skill system 125, respectively. Thus, the ASR component 150 may have its own I/O interface(s), processor(s), memory, and/or storage; the NLU component 160 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component(s) 120, and a skill system 125, as described herein, are illustrative, and may be located as a stand-alone device or may be included, in whole or in part, as a component of a larger device or system. As can be appreciated, a number of components may exist either on a system component(s) 120 and/or on device 110. For example, language processing 692/792 (which may include ASR 150/150), language output 693/793 (which may include NLG 679/779 and TTS 680/780), etc., for example as illustrated in FIGS. 6 and 7. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 14, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, the NLU component 160, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving first input audio data representing a first spoken natural language user input;
determining, using automatic speech recognition (ASR) processing, first ASR output data corresponding to a first textual transcription of the first input audio data;
determining, using natural language understanding (NLU) processing and the first ASR output data, first NLU output data;
determining, based on the first NLU output data, that the first spoken natural language user input is directed to a first skill;
receiving metadata corresponding to an expected set of data categories registered by the first skill to complete an action;
determining first data representing a first portion of the first textual transcription;
determining the first data represents a first phrase corresponding to a first data category;
determining the first data category is an unregistered data category for the first skill based on the expected set of data categories represented in the metadata;
based at least in part on the first data category being an unregistered data category based on the expected set of data categories, generating first output data indicating receipt of data of the first data category by the first skill; and
sending the first output data corresponding to an alert for output.

2. The computer-implemented method of claim 1, further comprising:
prior to receiving the first input audio data, receiving second output data corresponding to the first skill for output by a device;
determining that the second output data includes a request corresponding to the first data category; and
determining third output data associating the first skill with the request corresponding to the first data category.

3. The computer-implemented method of claim 1, further comprising:
determining a user profile corresponding to the first spoken natural language user input;
determining, based on the user profile, second data representing a user preference;
determining, using the second data, at least one restricted data category; and
generating notification based on the first output data and the user profile, wherein the expected set of data categories is further determined based on the at least one restricted data category.

4. The computer-implemented method of claim 1, further comprising:
receiving second input audio data of a second spoken natural language user input;
determining, using ASR processing, second ASR output data corresponding to a second textual transcription of the second input audio data;
determining, using NLU processing and the second ASR output data, second NLU output data;
determining, based on the second NLU output data, that the second spoken natural language user input is directed to the first skill;
determining second data representing a second portion of the second textual transcription;
determining the second data represents a second phrase corresponding to a second data category;
determining the second data category is included in the expected set of data categories; and
based at least in part on the second data category being included in the expected set of data categories, determining, using the second ASR output data and the second NLU output data, an action of the first skill.

5. A computer-implemented method comprising:
receiving first input data representing a first natural language user input;
determining, based on the first input data, that the first natural language user input is directed at a skill;
determining a first portion of the first input data corresponds to a first data type;
determining, using first metadata corresponding to the skill, a set of data types registered for receipt by the skill to complete an action;
determining the first data type is an unregistered data type for the skill based on the set of data types;
generating first output data corresponding to the first data type; and
sending the first output data corresponding to an alert for output.

6. The computer-implemented method of claim 5, further comprising:
receiving first data representing a dialog session corresponding to the first natural language user input;
determining, using the first data, second data representing a previous output determined by the skill, wherein the previous output preceded the first natural language user input; and
determining, using the second data, that the previous output includes a request corresponding to the first data type.

7. The computer-implemented method of claim 6, further comprising:
receiving third data representing at least one previous dialog session; and
generating a machine learning model using the third data, wherein determining that the first output data includes the request corresponding to the first data type further includes using the machine learning model.

8. The computer-implemented method of claim 5, further comprising:
receiving first data representing a dialog session corresponding to the first natural language user input;

determining, using the first data, second data representing a previous output determined by the skill, wherein the previous output preceded the first natural language user input; and determining, using the second data, that the previous output does not correspond to the first data type.

9. The computer-implemented method of claim 5, further comprising:

receiving second input data representing a second natural language user input;

determining, based on the second input data, that the second natural language user input is directed at the skill;

determining a portion of the second input data corresponds to a second data type;

determining the second data type is included in the set of data types; and based at least in part on the second data type being included in the set of data types, sending the second input data to a component corresponding to the skill.

10. The computer-implemented method of claim 5, further comprising:

determining a category type corresponding to the skill; and determining at least one data type of the set of data types based on the category type.

11. The computer-implemented method of claim 5, further comprising:

receiving first data representing a user preference; and determining, using the first data, at least one restricted data type, wherein the set of data types is further determined based on the at least one restricted data type.

12. The computer-implemented method of claim 5, further comprising:

determining second metadata based on the set of data types and the first data type;

determining first data representing an association between the second metadata and the skill; and storing the second metadata and the first data.

13. A system, comprising:

at least one processor; and at least one memory comprising instructions that, when executed by the at least one processor, cause the system to:

receive first data representing a system response to a first natural language user input, the system response corresponding to a skill;

determine the system response corresponds to a request to receive information corresponding to a first data type;

determine, using first metadata corresponding to the skill, a set of data types registered for receipt by the skill to complete an action;

determine the first data type is an unregistered data type for the skill based on the set of data types;

generate first output data corresponding to the first data type; and sending the first output data corresponding to an alert for output.

14. The system of claim 13, wherein the at least one memory further includes instructions that, when executed by the at least one processor, further cause the system to:

receive second data representing a dialog session corresponding to the system response and the first natural language user input;

determine, using the second data, third data representing a second natural language user input, wherein the second natural language user input follows the system response;

determine, using the third data, that the second natural language user input includes information corresponding to the first data type; and generate second output data corresponding to the second natural language user input including information corresponding to the first data type.

15. The system of claim 14, wherein the at least one memory further includes instructions that, when executed by the at least one processor, further cause the system to:

receive fourth data representing at least one previous dialog session; and generate a machine learning model using the fourth data, wherein determining that the system response corresponds to a request to receive information corresponding to a first data type further includes using the machine learning model.

16. The system of claim 13, wherein the at least one memory further includes instructions that, when executed by the at least one processor, further cause the system to:

receive second data representing a dialog session corresponding to the system response and the first natural language user input;

determine, using the second data, third data representing a second natural language user input, wherein the second natural language user input follows the system response; and determine, using the third data, that the second natural language user input does not include information corresponding to the first data type.

17. The system of claim 13, wherein the at least one memory further includes instructions that, when executed by the at least one processor, further cause the system to:

send the first output data to a component corresponding to the skill;

receive second data representing a second system response to the first natural language user input, the second system response corresponding to the skill;

determine the second system response corresponds to a request to receive information corresponding to a second data type;

determine the second data type is included in the set of data types; and generate, based on the second data, second output data corresponding to a natural language system response.

18. The system of claim 13, wherein the at least one memory further includes instructions that, when executed by the at least one processor, further cause the system to:

determine a category type corresponding to the skill; and determine at least one data type of the set of data types based on the category type.

19. The system of claim 13, wherein the at least one memory further includes instructions that, when executed by the at least one processor, further cause the system to:

receive second data representing a user preference; and determine, using the second data, at least one restricted data type, wherein the set of data types is further determined based on the at least one restricted data type.

20. The system of claim 13, wherein the at least one memory further includes instructions that, when executed by the at least one processor, further cause the system to:

determine second metadata based on the set of data types and the first data type;

determine second data representing an association between the second metadata and the skill; and store the second metadata and the second data.

* * * * *